US010853650B2

(12) United States Patent
Murata et al.

(10) Patent No.: US 10,853,650 B2
(45) Date of Patent: Dec. 1, 2020

(54) INFORMATION PROCESSING APPARATUS, INFORMATION PROCESSING METHOD, AND PROGRAM

(71) Applicant: Sony Corporation, Tokyo (JP)

(72) Inventors: Makoto Murata, Tokyo (JP); Naoki Shibuya, Tokyo (JP); Junko Takabayashi, Tokyo (JP); Yuuji Takimoto, Kanagawa (JP); Koji Sato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/381,017

(22) Filed: Apr. 11, 2019

(65) Prior Publication Data

US 2019/0236368 A1    Aug. 1, 2019

Related U.S. Application Data

(63) Continuation of application No. 15/303,391, filed as application No. PCT/JP2015/057861 on Mar. 17, 2015, now Pat. No. 10,311,303.

(30) Foreign Application Priority Data

May 22, 2014   (JP) ................................ 2014-106276

(51) Int. Cl.
*G06K 9/00* (2006.01)
*G06F 16/2457* (2019.01)
(Continued)

(52) U.S. Cl.
CPC ....... *G06K 9/00671* (2013.01); *G06F 1/1686* (2013.01); *G06F 3/002* (2013.01);
(Continued)

(58) Field of Classification Search
None
See application file for complete search history.

(56) References Cited

U.S. PATENT DOCUMENTS 7,921,036 B1    4/2011   Sharma et al.
2011/0081634 A1   4/2011   Kurata et al.
(Continued)

FOREIGN PATENT DOCUMENTS

JP    2004213623 A    7/2004
JP    2006-259641 A   9/2006
(Continued)

OTHER PUBLICATIONS

Japanese Office Action dated May 7, 2019, issued in corresponding JP Application No. 2016-520969, 4 pages.
(Continued)

*Primary Examiner* — Wei Wen Yang
(74) *Attorney, Agent, or Firm* — Xsensus, LLP

(57) ABSTRACT

There is provided an information processing apparatus for automatically generating information representing a context surrounding a user, the information processing apparatus including: a recognition processing unit configured to perform, on the basis of user environment information including at least any of location information representing a location where a user is present, image information relating to an environment surrounding a user, and audio information relating to the environment, an analysis process of at least any of the location information, the image information, and the audio information included in the user environment information, at a predetermined time interval, and to recognize a context surrounding the user, using the acquired result of analysis relating to the user environment; and a context candidate information generating unit configured to generate context candidate information representing a candidate of the context surrounding the user, the context candidate
(Continued)

information including, at least, information representing the context surrounding the user and information representing the user's emotion in the context, using the result of context recognition performed by the recognition processing unit.

20 Claims, 28 Drawing Sheets

(51) Int. Cl.

| | | |
|---|---|---|
| G06K 9/62 | (2006.01) | |
| G06K 9/72 | (2006.01) | |
| G06F 3/0489 | (2013.01) | |
| G06F 1/16 | (2006.01) | |
| G06F 3/00 | (2006.01) | |
| G06F 3/01 | (2006.01) | |
| G06F 3/03 | (2006.01) | |
| G06Q 50/00 | (2012.01) | |
| G06F 16/435 | (2019.01) | |
| G06F 40/00 | (2020.01) | |

(52) U.S. Cl.
CPC ............ *G06F 3/011* (2013.01); *G06F 3/0304* (2013.01); *G06F 3/04895* (2013.01); *G06F 16/24575* (2019.01); *G06F 16/435* (2019.01); *G06F 40/00* (2020.01); *G06K 9/00342* (2013.01); *G06K 9/00664* (2013.01); *G06K 9/6293* (2013.01); *G06K 9/72* (2013.01); *G06Q 50/01* (2013.01)

(56) References Cited

U.S. PATENT DOCUMENTS

| | | | | |
|---|---|---|---|---|
| 2011/0280447 | A1* | 11/2011 | Conwell | ................ G06K 9/228 382/103 |
| 2012/0150871 | A1 | 6/2012 | Hua et al. | |
| 2012/0317114 | A1 | 12/2012 | Sato | |
| 2013/0038756 | A1 | 2/2013 | Cheng | |
| 2013/0142423 | A1* | 6/2013 | Zhang | ................ G06K 9/00677 382/159 |
| 2014/0108541 | A1 | 4/2014 | Kawai | |
| 2014/0129650 | A1 | 5/2014 | Coatta et al. | |
| 2014/0372467 | A1 | 12/2014 | Locker et al. | |
| 2015/0070351 | A1 | 3/2015 | Tarquini et al. | |

FOREIGN PATENT DOCUMENTS

| | | |
|---|---|---|
| JP | 2007-193824 A | 8/2007 |
| JP | 2008-003655 A | 1/2008 |
| JP | 2008204193 | 9/2008 |
| JP | 2011-053776 A | 3/2011 |
| JP | 2011-081431 A | 4/2011 |
| JP | 2013-101450 A | 5/2013 |
| JP | 2013-145526 A | 7/2013 |
| JP | 2013-164650 A | 8/2013 |
| JP | 2014-38429 A | 2/2014 |
| JP | 2014-81770 A | 5/2014 |
| WO | 2013/074233 A1 | 5/2013 |

OTHER PUBLICATIONS

Extended European Search Report dated Dec. 5, 2019 in European Application No. 19192341.6-1207.
Apostolakis Konstantinos C et al: "An application framework for implicit sentiment human-centered tagging using attributed affect", 2013 14th International Workshop on Image Analysis for Multimedia Interactive Services (WIAMIS), IEEE, Jul. 3, 2013 (Jul. 3, 2013), XP032492762.
Japanese Office Action issued Jun. 23, 2020, in corresponding Japanese Patent Application No. 2019-132116.
Japanese Office Action issued Jun. 23, 2020, in corresponding Japanese Patent Application No. 2019-132117.
Japanese Office Action dated Jun. 23, 2020, in corresponding Japanese Patent Application No. 2019-132116.
Futoichi Uehigashi et al., "Symposium of Recognition of Eating Images of 50 kinds based on Multiple Kernel Learning and Recognition • Understanding of Image" (MIRU 2009), Japan, Image Information Forum, Information Processing Society of Japan, The Institute of Electronics, Information and Communication Engineers, Jul. 2009.

* cited by examiner

FIG. 12A

| Category | Context | | Sub Context | Example | OUTPUT FREQUENCY |
|---|---|---|---|---|---|
| Image | FACE | | -- | NUMBER OF FACES, COORDINATE, ANGLE, PROPERTY, AMOUNT OF FACE CHARACTERISTIC, PROPERTY, etc. | SECOND |
| | DISH | | -- | AREA OF DISH, SCORE OF DISH, CATEGORY OF DISH, etc. | MINUTE |
| | LANDSCAPE | | -- | SCORE AS BEAUTIFUL LANDSCAPE, etc. | SECOND |
| | IMAGE SCENE CLASSIFICATION | | -- | PLACE AND CONTEXT OF USER, etc. | SECOND |
| | OBJECT RECOGNITION | | -- | TYPE OF OBJECT BEING WATCHED, etc. | SECOND |
| Audio | AUDIO CLASSIFICATION | | -- | CONVERSATION, LAUGHTER, CHEERING, APPLAUSE, BGM, AND OTHERS | SECOND |
| | AUDIO RECOGNITION | | -- | RECOGNITION OF WORDS AND CONTENT OF CONVERSATION | SECOND |
| Location | LATITUDE AND LONGITUDE | | -- | EAST LONGITUDE, WEST LONGITUDE, NORTH LATITUDE, SOUTH LATITUDE | SECOND |
| | STAYING OR MOVING | | -- | {STAYING IN CERTAIN PLACE OR MOVING} | SECOND |
| | PLACE | | CATEGORY | {OFFICE BUILDING, RESIDENCE, SCHOOL, RESTAURANT, SHOP, PARK, etc.} | MINUTE |
| | | | NAME | {WORKPLACE, HOME, XX STORE, XX PARK, etc.} | MINUTE |
| | WEATHER | | -- | {SUNNY, CLOUDY, RAINY, HIGHEST TEMPERATURE, PROBABILITY OF PRECIPITATION, HUMIDITY, ATMOSPHERIC PRESSURE, WIND VELOCITY, etc.} | MINUTE |
| Activity | TRANSPORTATION MEANS | | -- | {WALK, RUN, RESTING, JUMP, ELEVATOR, CAR, TRAIN, AUTOMOBILE, etc.} | SECOND TO MINUTE |
| Fusion | COMPANION | | NUMBER OF PERSONS | {BEING ALONE, BEING WITH SOMEONE, etc.} | MINUTE |
| | | | NAME | {PEOPLE A, B, C, ..., etc.} | MINUTE |
| | | | STATE | {TALKING, EXCITED, SILENT, etc.} | MINUTE |
| | HIGH-LEVEL CONTEXT | | -- | {EATING (DINING OUT, AT HOME), WORKING (DESKWORK, MEETING), SHOPPING, etc.} | MINUTE |

FIG. 12B

| Category | Context | ANALYSIS RESULT USED | | | | |
|---|---|---|---|---|---|---|
| | | IMAGE ANALYSIS RESULT | AUDIO ANALYSIS RESULT | PLACE ANALYSIS RESULT | ACTIVITY ANALYSIS RESULT |
| Image | FACE | ○ | - | - | - |
| | DISH | ○ | - | - | - |
| | LANDSCAPE | ○ | - | - | - |
| | IMAGE SCENE CLASSIFICATION | ○ | - | - | - |
| | OBJECT RECOGNITION | ○ | - | - | - |
| Audio | AUDIO CLASSIFICATION | - | ○ | - | - |
| | AUDIO RECOGNITION | - | ○ | - | - |
| Location | LATITUDE AND LONGITUDE | - | - | ○ | - |
| | STAYING OR MOVING | - | - | ○ | ○ |
| | PLACE | - | - | ○ | - |
| | WEATHER | - | - | ○ | - |
| Activity | TRANSPORTATION MEANS | - | ○ | - | ○ |
| Fusion | COMPANION | ○ | - | - | - |
| | HIGH-LEVEL CONTEXT | ○ | ○ | ○ | ○ |

FIG. 14B

| Where | Who | What | How | SENTENCE PATTERN |
|---|---|---|---|---|
| ○ | ○ | ○ | ○ | DO "WHAT" WITH "WHOM" AT "WHERE" AND "HOW" |
| ○ | – | – | – | BEING "WHERE" |
| ○ | ○ | – | – | BEING "WHERE" WITH "WHOM" |
| ○ | – | ○ | – | WATCHING "WHAT" AT "WHERE" |
| ○ | – | – | ○ | "WHERE" AND "HOW" |
| ○ | ○ | ○ | – | WATCHING "WHAT" WITH "WHOM" AT "WHERE" |
| ○ | ○ | – | ○ | DO WITH "WHOM" AT "WHERE" AND "HOW" |
| ○ | – | ○ | ○ | DO "WHAT" AT "WHERE" AND "HOW" |
| – | ○ | ○ | ○ | DO "WHAT" WITH "WHOM" AND "HOW" |
| – | ○ | – | – | BEING WITH "WHOM" |
| – | – | ○ | – | WATCHING "WHAT" |
| – | – | – | ○ | "HOW" |
| – | ○ | ○ | – | WATCHING "WHAT" WITH "WHOM" |
| – | ○ | – | ○ | DO "HOW" WITH "WHOM" |
| – | – | ○ | ○ | DO "WHAT" AND "HOW" |
| – | – | – | – | (NOT GENERATE) |

FIG. 15

| | | POSITIVE | NEUTRAL | NEGATIVE |
|---|---|---|---|---|
| CONTEXT | EATING | VERY DELICIOUS (^_^) REEEALLY YUMMY | DELICIOUS YUMMY | NOT SO DELICIOUS DISAPPOINTED |
| | WATCHING LANDSCAPE | VERY BEAUTIFUL! HAVE NEVER SEEN | BEAUTIFUL | NOT SO BEAUTIFUL |
| | AFTER SEEING MOVIE | REALLY ENJOYED IT! IMPRESSIVE | SO SO | UNINTERESTING |
| PLACE | LEISURE FACILITY | WAS A LOT OF FUN! | GOOD | NOT SO INTERESTING UNINTERESTING |
| | WORKPLACE | HAD A VERY GOOD TIME | GOOD | NOT SO BAD |
| PERSON | WITH LOVER | REEEALLY HAPPY | — | WORST OF WORST |
| | WITH BOSS | GET NERVOUS | WHAT AM I GOING TO DO? | WHY THE HELL |
| | ... | ... | ... | ... |
| OTHERS | | REALLY ENJOYED IT | GOOD | BORING |

FIG. 16

| CLASSIFY BY DEGREE OF EMOTION | | CLASSIFY BY TYPE OF EMOTION |
|---|---|---|
| EXAMPLE OF N=2 | EXAMPLE OF N=3 | EXAMPLE OF N=5 |
| POSITIVE (INTERESTING) | POSITIVE (INTERESTING) | PLEASURE (DELIGHTFUL) |
| NEGATIVE (BORING) | NEUTRAL (BORING) | ANGER (IRRITATED) |
| | NEGATIVE (BORING) | SADNESS (SAD) |
| | | FUN (HAVING FUN) |
| | | SURPRISE (SURPRISED) |

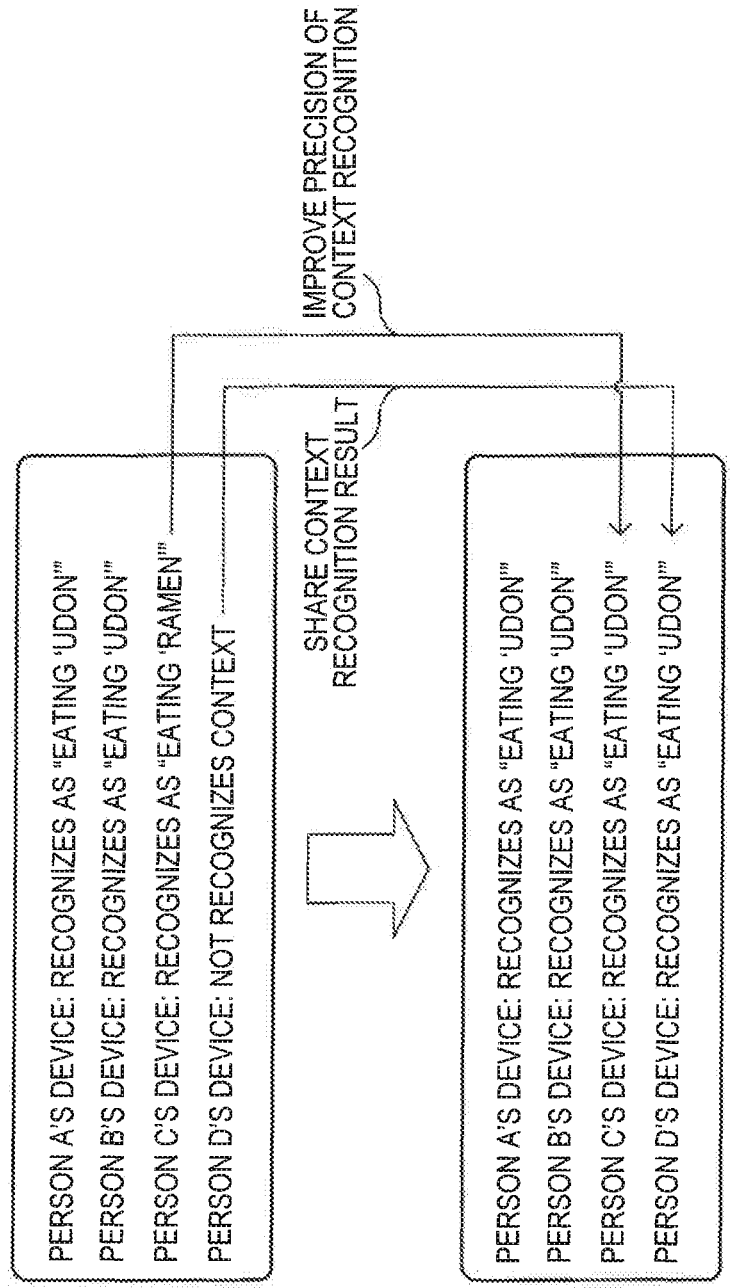

INFORMATION PROCESSING APPARATUS, INFORMATION PROCESSING METHOD, AND PROGRAM

CROSS-REFERENCE TO RELATED APPLICATIONS

This application, is a continuation of U.S. application Ser. No. 15/303,391, filed Oct. 11, 2016, which is based on PCT filing PCT/JP2015/057861, filed Mar. 17, 2015, and claims priority to JP 2014-106276, filed May 22, 2014, the entire contents of each are incorporated herein by reference.

TECHNICAL FIELD

The present disclosure relates to an information processing apparatus, an information processing method, and a program.

BACKGROUND ART

In recent years, there is widely used Internet-based Social Network Services (SNS) or the like, as a tool for recording a person's own activity, or disclosing a person's own activity to a large number of specified or unspecified people.

Here, recording of a person's own activity to a social network service is performed by creating an article to be posted by the user himself or herself, attaching image data or the like to the article as necessary, and subsequently transmitting the data to a management server in charge of managing the social network service. Accordingly, the user may be preoccupied with the activity he or she is currently engaging and forget to create the article to be posted.

In order to mitigate such a situation, Patent Literature 1 described below, for example, discloses a method of automatically recognizing the user's activity, and automatically generating an entertaining sentence on the basis of the acquired recognition result.

CITATION LIST

Patent Literature

Patent Literature 1 JP 2008-3655A

SUMMARY OF INVENTION

Technical Problem

Using the method described in Patent Literature 1 allows an activity pattern such as "leisurely walking" or "restless movement" to be as chronological data. However, the activity pattern acquired by the aforementioned method mainly represents the user's movement or state in a relatively short time. Therefore it is difficult to estimate a specific content of activity such "ate in a hotel restaurant yesterday" or "shopped in a department store today" from the history of the activity pattern. In addition, individual activities forming an activity pattern acquired by the method described in Patent Literature 1 are in themselves not performed by a purpose by the user, and therefore it is unlikely that posting a sentence generated on the basis of the acquired activity pattern to a social network service helps to make the sentence seem interesting when reviewed at a later time.

On the other hand, an article posted to a social network service and still seeming interesting is one relating to various contexts surrounding the user that have resulted from tangling of the user's individual activities in a complicated manner. Accordingly, in order to further improve the user's convenience, with regard to posting to a social network service, it is desired to realize a technique that allows for recognizing a context surrounding a user and automatically generating information representing the context surrounding the user on the basis of the result of context recognition.

Therefore, the present disclosure proposes an information processing apparatus an information processing method, and a program capable of automatically generating information representing a context surrounding a user.

Solution to Problem

According to the present disclosure, there is provided an information processing apparatus including: a recognition processing unit configured to perform, on the basis of user environment information including at least any of location information representing a location where a user is present, image information relating to an environment surrounding a user, and audio information relating to the environment, an analysis process of at least any of the location information, the image information, and the audio information included in the user environment information, at a predetermined time interval, and to recognize a context surrounding the user, using the acquired result of analysis relating to the user environment; and a context candidate information generating unit configured to generate context candidate information representing a candidate of the context surrounding the user, the context candidate information including, at least, information representing the context surrounding the user and information representing the user's emotion in the context, using the result of context recognition performed by the recognition processing unit.

According to the present disclosure, there is provided an information processing method including: performing, on the basis of user environment information including at least any of location information representing a location where a user is present, image information relating to an environment surrounding a user, and audio information relating to the environment, an analysis process of at least any of the location information, the image information, and the audio information included in the user environment information, at a predetermined time interval, and recognizing a context surrounding the user, using the acquired result of analysis relating to the user environment; and generating context candidate information representing a candidate of the context surrounding the user, the context candidate information including, at least, information representing the context surrounding the user and information representing the user's emotion in the context, using the result of context recognition.

According to the present disclosure, there is provided a program for causing a computer to realize: a recognition processing function of performing, on the basis of user environment information including at least any of location information representing a location where a user is present, image information relating to an environment surrounding a user, and audio information relating to the environment, an analysis process of at least any of the location information, the image information, and the audio information included in the user environment information, at a predetermined time interval, and recognizing a context surrounding the user, using the acquired result of analysis relating to the user environment; and a context candidate information generating function of generating context candidate information representing a candidate of the context surrounding the user, the context candidate information including, at least, information representing the context surrounding the user and information representing the user's emotion in the context, using the result of context recognition performed by the recognition processing unit.

According to the present disclosure, a context surrounding a user is recognized using a result of analysis performed for user environment information with regard to a user environment, and context candidate information representing a candidate of the context surrounding the user, including, at least, information representing the context surrounding the user and information representing the user's emotion in the context is generated using the acquired context recognition result.

Advantageous Effects of Invention

According to the present disclosure as described above, it becomes possible to automatically generate information representing a context surrounding a user.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 12A is an explanatory diagram illustrating a result of recognition by the recognition processing unit according to the embodiment.

FIG. 12B is an explanatory diagram illustrating a result of recognition by the recognition processing unit according to the embodiment.

FIG. 14B is an explanatory diagram illustrating a context candidate information generating process performed by the context candidate information generating unit according to the embodiment.

FIG. 15 is an explanatory diagram illustrating a context candidate information generating process performed by the context candidate information generating unit according to the embodiment.

FIG. 16 is an explanatory diagram illustrating a context candidate information generating process performed by the context candidate information generating unit according to the embodiment.

FIG. 19 is an explanatory diagram illustrating an external device cooperation process performed by the external device cooperation unit according to the embodiment.

DESCRIPTION OF EMBODIMENT(S)

Figure 1:
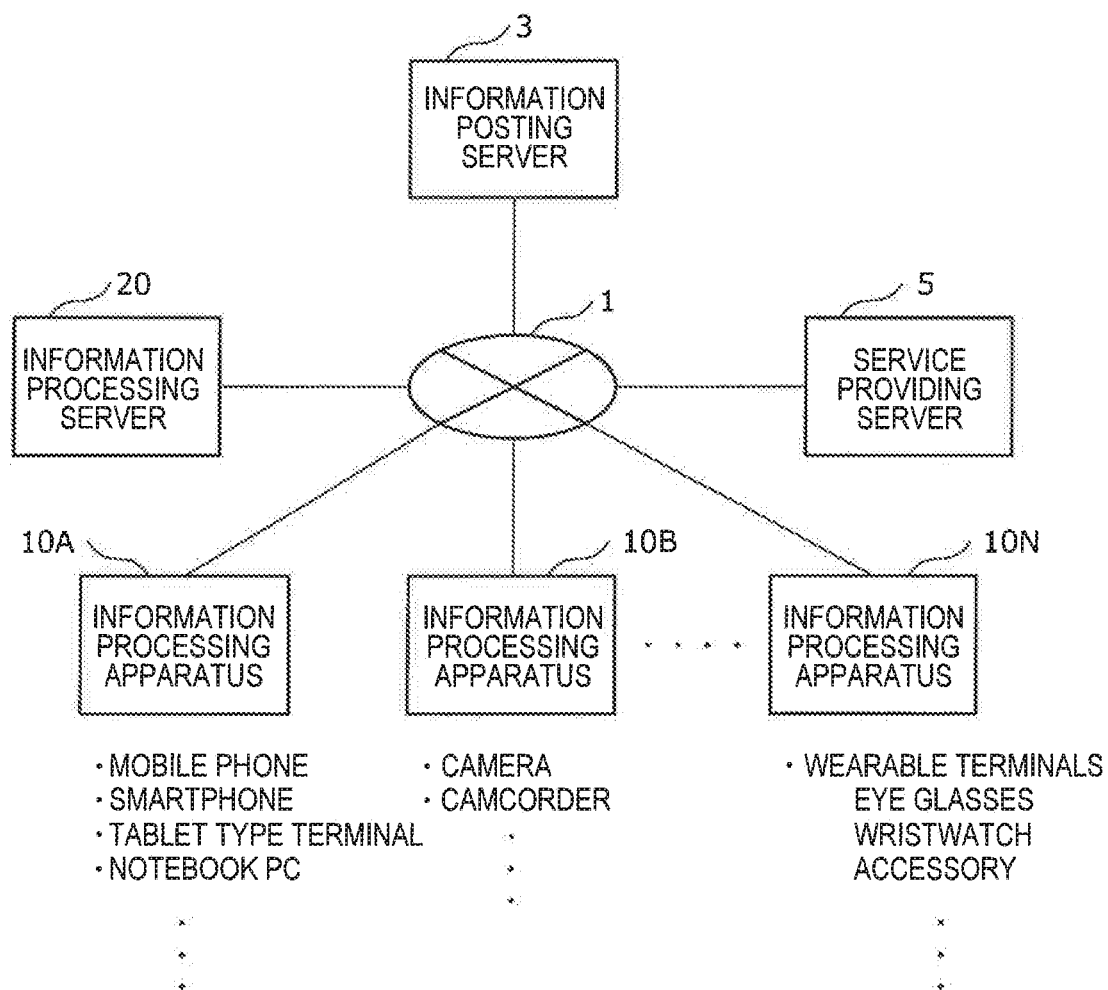
FIG. 1 is an explanatory diagram illustrating an information processing system-according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.

1. First embodiment
 1.1. Information processing system
 1.2. Information processing apparatus
 1.3. Exemplary variation of information processing apparatus
 1.4. Exemplary display screen
 15. Exemplary flow of context candidate information generating process
 1.6. Information processing method
2. Hardware configuration of information processing apparatus First Embodiment <Information Processing System>

First, an information processing system including an information processing apparatus according to a first embodiment of the present disclosure will be briefly described, referring to FIG. 1. FIG. 1 is an explanatory diagram schematically illustrating an overall configuration of an information processing system according the present embodiment.

An information processing system according to the present embodiment includes one or more information processing apparatuses 10 connected to a network 1 of various types such as the Internet, a wireless communication network, and a mobile communication network. In the information processing system illustrated in FIG. 1, the network 1 has connected thereto N information processing apparatuses 10A to 10N (may also be collectively referred to as "information, processing apparatuses 10", in the following). Here, the number of information processing apparatuses 10 connected to the network 1 is not limited in particular.

The information processing system according to the present embodiment has connected thereto, via the network 1, an information posting server 3 that manages various information posting services of a social network system or the like. In addition, the network 1 has connected thereto a service providing server 5 of various types such as, for example, a server capable of acquiring information relating to locations, or a server capable of acquiring information relating to the weather. For example, there are a GPS (Global Positioning System) server, a server managing a wireless communication network, a server managing a mobile communication network, as examples of a server capable of acquiring information relating to locations.

The information processing apparatus 10 according to the present embodiment is capable of transmitting and receiving various information to and from the information posting server 3, the service providing server 5, or the like, via the network 1.

Here, the information processing apparatuses 10 according to the present embodiment are not particularly limited in terms of types and may be realized using known devices. For example, the information processing apparatuses 10 may be personal digital assistants which users may carry around such as mobile phones, smartphones, tablet type terminals, notebook PCs, or the like. In addition, the information processing apparatuses 10 may be various cameras such as digital cameras, camcorders, or the like. In addition, the information processing apparatuses 10 may be wearable terminals such as eye glasses, wristwatches, or various accessories.

In addition, the information processing apparatuses 10 according to the present embodiment are also capable of performing the processes described below, cooperatively with an information processing server 20 such as various computers or servers.

As thus, the configuration of the information processing system according to the present embodiment has been briefly described above, referring to FIG. 1.

<Information Processing Apparatus>

Next, an information processing apparatus 10 according to the present embodiment will be described in detail, referring to FIGS. 2 to 19.

Figure 2:
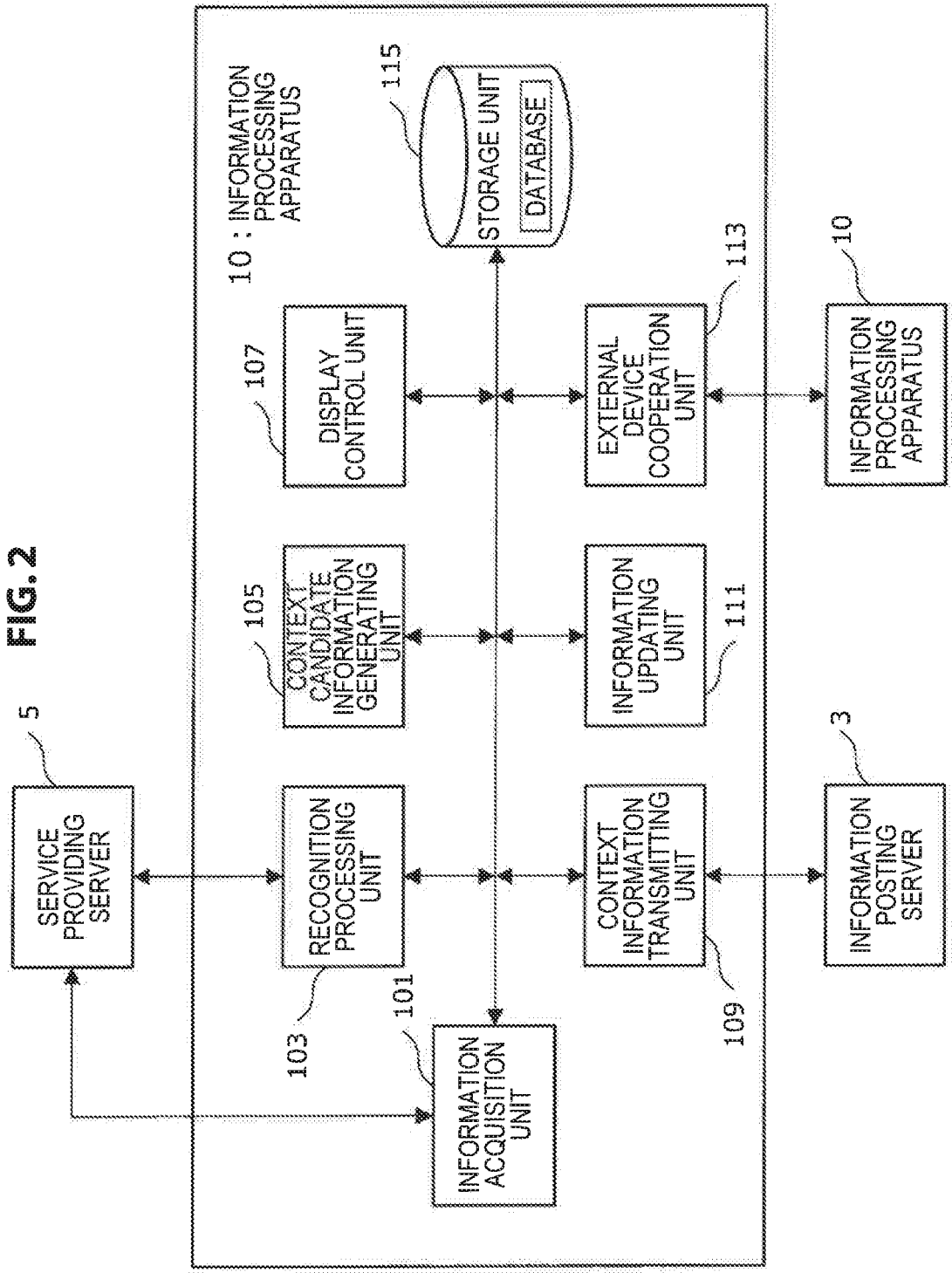
FIG. 2 is a block diagram illustrating an exemplary configuration of the information processing apparatus according to the embodiment.

First, a configuration of the information processing apparatus 10 according to the present embodiment will be described, referring to FIG. 2. FIG. 2 is a block diagram schematically illustrating an exemplary configuration of the information processing apparatus 10 according to the present embodiment.

The information processing apparatus 10 according to the present embodiment mainly includes, as illustrated in FIG. 2, an information acquisition unit 101, a recognition processing unit 103, a context candidate information generating unit 105, a display control unit 107, a context information transmitting unit 109, an information updating unit 111, an external device cooperation unit 113, and a storage unit 115.

Information Acquisition Unit 101

The information acquisition unit an is realized by, for example, a CPU (Central Processing Unit), a ROM (Read-Only Memory), a RAM (Random Access Memory), an input device, a communication device, a sensor, and the like. The information acquisition unit 101 acquires user environment information including at least any of: location information representing the location of a user carrying the information processing apparatus 10; image information relating to the environment surrounding the user; audio information relating to the environment surrounding the user, and the like.

The information acquisition unit 101 acquires, at a predetermined time interval, various location information, various image information such as still images or video images, or acquires audio information. For example, the information acquisition unit 101 may acquire information on a location where a user is present, using a GPS server, Wi-Fi, Cell ID, or the like. In addition, the information acquisition unit 101 may acquire image information such as still images or video images, using various cameras provided in the information processing apparatus 10. In addition, the information acquisition unit 101 may acquire audio information, using various microphones provided in the information processing apparatus 10.

In addition, the information acquisition unit 101 may acquire, as biological information intrinsic to a user, presence or absence of the user's perspiration, the user's body temperature and heartbeat, biogenic substances existing on the surface or inside of the user's body, and the like, using various biosensors provided in the information processing apparatus 10.

Note that the information acquisition unit 101 may acquire various user environment information by transmitting and receiving data to and from various service providing servers 5 present on the network 1.

The various user environment information such as those acquired by the information acquisition unit 101 are output to the recognition processing unit 103 described below whenever necessary, and used for various recognition processes performed by the recognition processing unit 103. In addition, the information acquisition unit 101 stores, for example, the acquired location information, image information or audio information in the storage unit 115 or the like as attached data to be used for generating context candidate information described below, when the amount of characteristic characterizing the environment surrounding the user according to a recognition process performed by the recognition processing unit 103 described below satisfies a predetermined condition.

In addition, the various user environment information acquired by the information acquisition unit 101 are output to, and used as appropriate in, the context candidate information generating unit 105, the display control unit 107, the context information transmitting unit 109, the information updating unit 111, the external device cooperation unit 113, or the like, besides the recognition processing unit 103 and the storage unit 115 described below.

Recognition Processing Unit 103

The recognition processing unit 103 is realized by, for example, a CPU, a ROM, a RAM, a communication unit, and the like. The recognition processing unit 103 performs, at a predetermined time interval, an analysis process of at least any of location information, image information and audio information included in the user environment information, on the basis of user environment information acquired by the information acquisition unit 101. In addition, tbc recognition processing unit 103 performs a context recognition process of recognizing the context surrounding the user using the analysis result relating to the acquired user environment.

Figure 3:
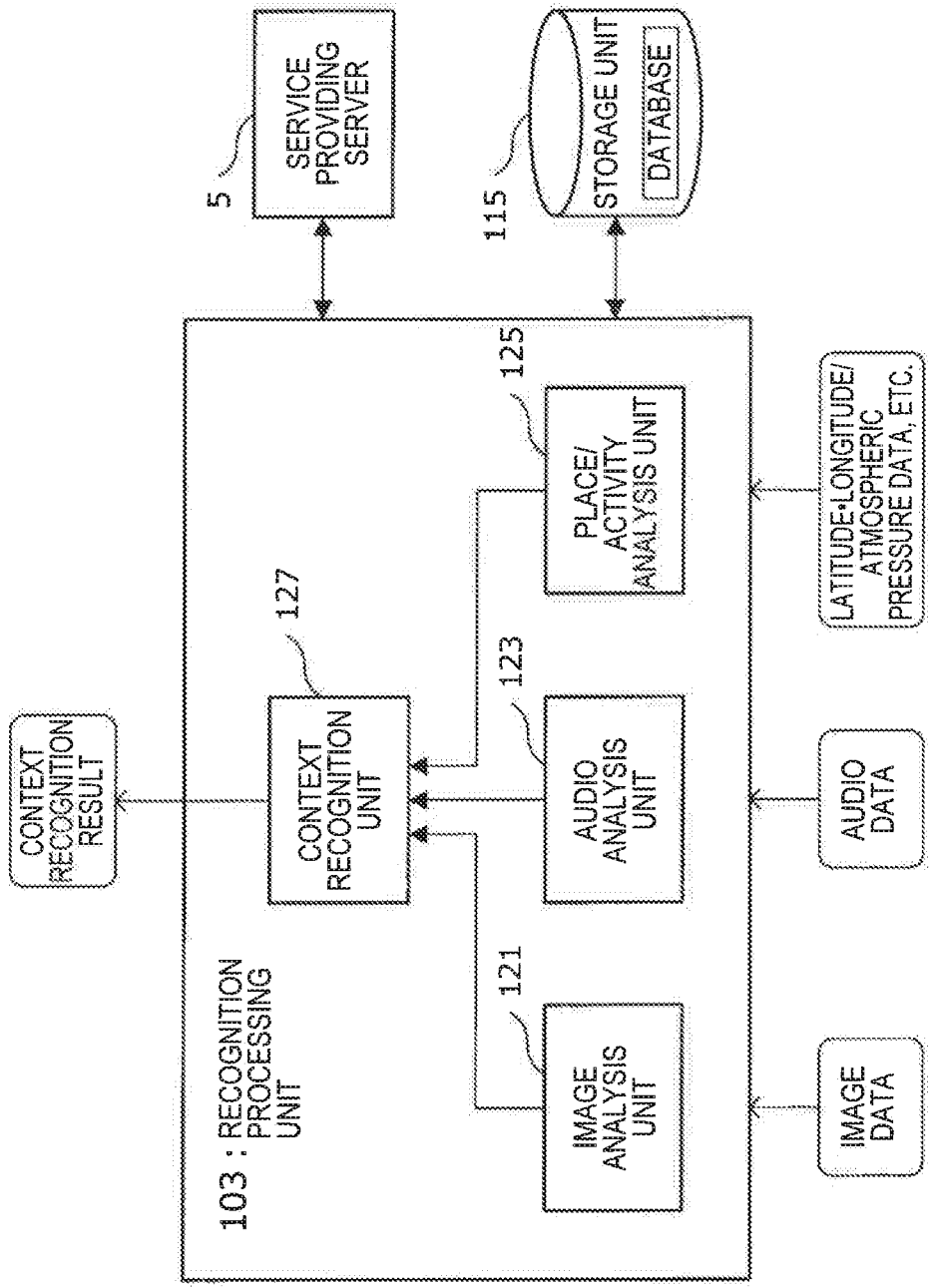
FIG. 3 is a block diagram illustrating an exemplary configuration of a recognition processing unit included in the information processing apparatus according to the embodiment.

The recognition processing unit 103 has, as schematically illustrated in FIG. 3, an image analysis unit 121, an audio analysis unit 123, a place/activity analysis unit 125, and a context recognition unit 127, for example.

The image analysis unit 121 is realized by, for example, a CPU, a ROM, a RAM, a communication unit, and the like. The image analysis unit 121 analyzes image information (i.e., image data) acquired by the information acquisition unit 101 to recognize the faces, landscapes, dishes, and various objects existing in the image corresponding to the image data, or classify image scenes.

Figure 4:
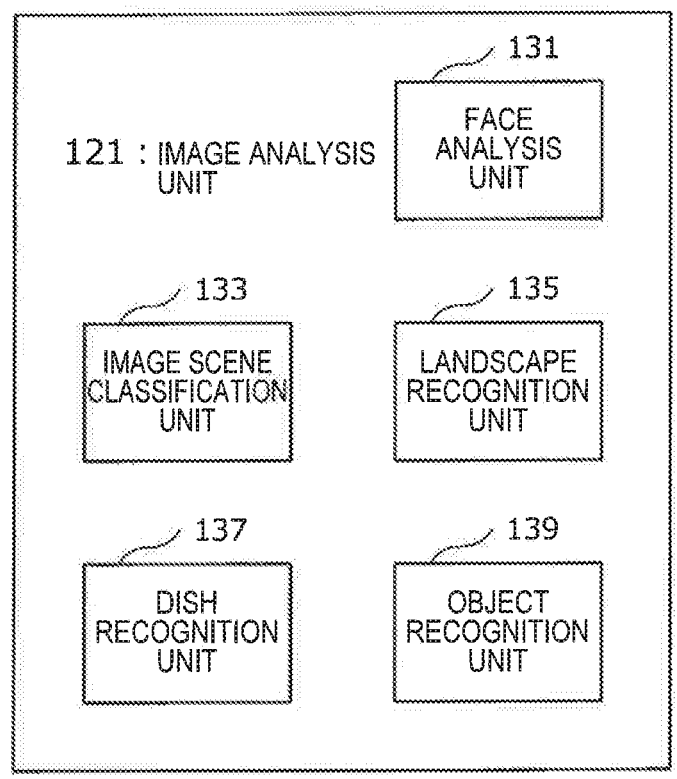
FIG. 4 is a block diagram illustrating an exemplary configuration of an image analysis unit included in the recognition processing unit according to the embodiment.

The image analysis unit 121 has, as illustrated in FIG. 4, a face analysis unit 131, an image scene classification unit 133, n landscape recognition unit 135, a dish recognition unit 137, and an object recognition unit 139, and the like.

The face analysis unit 131 is realized by, for example, a CPU, a ROM, a RAM, a communication unit, and the like. The face analysis unit 131 is a processing unit that recognizes whether or not a person's face is included in an image corresponding to the image data. An amount of detected face characteristic characterizing whether or not a face is present in the image is calculated by analyzing the image data by the face analysis unit 131 whenever necessary. When, in addition, a face is present in the image, the face analysis unit 131 identifies the region corresponding to the face, or identifies, for example, who the person corresponding to the recognized face is. When the amount of detected face characteristic calculated by the face analysis unit 131 is equal to or larger than a predetermined threshold value, the recognized image data is stored in the storage unit 115 or the like. Besides the foregoing, the face analysis unit 131 may identify the number of faces, coordinates, angles, or may calculate various properties such as face detection score, face part location, presence or absence of smile, living thing, age, race, as the amount of detected face characteristic.

The image scene classification unit 133 is realized by, for example, a CPU, a ROM, a RAM, a communication unit, and the like. The image scene classification unit 133 is a processing unit that classifies what type of scene an image corresponding to the image data is. Analyzing the image data by the image scene classification unit 133 whenever necessary, allows calculation of the amount of scene classification characteristic indicating what type of scene the image is to be classified. In addition, analyzing the image data by the, image scene classification unit 133 whenever necessary allows identification of the place (e.g., workplace, restaurant, etc.) where the user exists, or the context (driving a car, watching TV, etc.). When the amount of scene classification characteristic calculated by the image scene classification unit 133 is equal to or larger than a predetermined threshold value, the recognized image data is stored in the storage unit 115 or the like.

The landscape, recognition unit 135 is realized by, for example, a CPU, a ROM, a RAM, a communication unit, and the like: The landscape recognition unit. 135 is a processing unit recognizes whether. Or not an image corresponding to the image data is a captured image of a landscape. Analyzing the image data by the landscape recognition, unit 135 whenever necessary allows calculation of amount of detected landscape characteristic characterizing whether or not there exists a landscape in the image. When, in addition, there exists a landscape in the image, the landscape recognition unit 135 identifies the region corresponding to the landscape; or identifies the place corresponding to the recognized landscape. When the amount of detected landscape characteristic calculated by the landscape recognition unit 135 is equal to or larger than a predetermined threshold value, the recognized image data is stored in the unit 115 or the like. In addition, the landscape recognition unit 135 may also calculate a score indicating the degree of being a beautiful landscape as the amount of detected landscape characteristic.

The dish recognition unit 137 is realized by, for example, a CPU, a ROM, a RAM, a communication unit, and the like. The dish recognition unit 137 is a processing unit that recognizes whether or not a part corresponding to a dish is included in the image corresponding to the image data. Analyzing the image data using the dish recognition unit 137 whenever necessary allows calculation of the amount of cooking detection characteristic characterizing whether or riot there exists a dish in the image. When, in addition, there exists a dish in the image, the dish recognition unit 137 identifies the region corresponding to the dish, or identifies the category of the recognized dish (e.g., rice, miso soup, curry and rice, pasta, cake, etc.). When the amount of dish detection characteristic calculated by the dish recognition unit 137 is equal to or larger than predetermined threshold value, the recognized image data is stored in the storage unit 115 or the like.

The object recognition unit 139 is realized by, for example, a CPU, a ROM, a RAM, a communication unit, and the like. The object recognition unit 139 is a processing unit that recognizes various objects existing in the image corresponding to the image data. Analyzing the image data using the object recognition unit 139 whenever necessary allows calculation of the amount of object detection characteristic characterizing whether or not there exist various objects in the image. When, in addition, there exists an object in the image, the object recognition unit 139 identifies the region corresponding to the object, or identifies the type of the recognized object. When the amount of object detection characteristic calculated by the object recognition unit 139 is equal to or larger than the predetermined threshold value, the recognized image data is stored in the storage unit 115 or the like.

The results of processes performed by respective processing units described above are output to the information acquisition unit 101, the audio analysis unit 123, the place/activity analysis unit 125, and the context recognition unit 127 whenever necessary.

Note that the detailed method of the various analysis/recognition processes performed by respective processing units described above is not limited in particular, and known methods such as that disclosed in JP 2010-191934A, for example, may be used. In addition, the image analysis unit 121 may perform the aforementioned image recognition process, using the service providing server 5 connected on the network 1 and configured to provide an image recognition service.

Returning to FIG. 3 again, the audio analysis unit 123 included in the recognition processing unit 103 according to the present embodiment will be described.

The audio analysis unit 123 is realized by, for example, a CPU, a ROM, a RAM, a communication unit, and the like. The audio analysis unit 123 analyzes audio information (i.e., audio data) acquired by the information acquisition unit 101 to classify the audio data, or recognize the content of the audio data.

Figure 5:
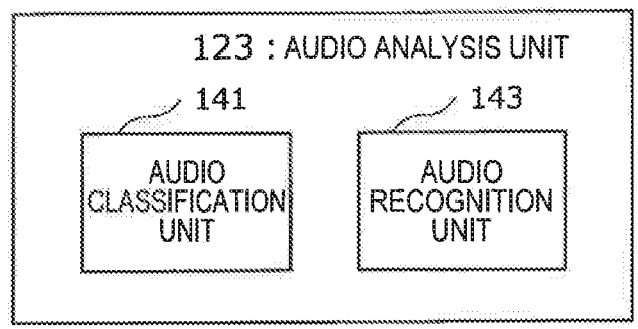
FIG. 5 is a block diagram illustrating an exemplary configuration of an audio analysis unit included in the recognition processing unit according to the embodiment.

The audio analysis unit 123 farther includes an audio classification unit 141, an audio recognition unit 143, and the like, as illustrated in FIG. 5.

The audio classification unit 141 is realized by, for example, a CPU, a ROM, a RAM, a communication unit, and the like. The audio classification unit 141 analyzes audio data acquired by the information acquisition unit 101 and calculates the amount of characteristic relating to the audio data. More specifically, the audio classification unit 141 performs a process of classifying whether the audio data is conversation, laughter, cheering, plosive audio (onomatopoeia), whether it is an audio expressing praise such as applause, music, or the like. The classification process of such audio data may be performed by, for example, referring to a database for audio analysis preliminarily stored in the storage unit 115 or the like, or performing a program for audio analysis or the like.

In addition, the audio classification unit 141 may also analyze the audio volume of the audio data and output the audio volume in a quantified manner, for example. Additionally, in a case where the audio data is one which has originated from a human being such as conversation or laughter, the audio classification unit 141 may analyze whether the person originating the audio is a male, a female, or a child. The analyses may be performed by, for example, analyzing the amplitude of the corresponding wave pattern, the frequency of the audio data, or the like, referring to the spectra representing the audio.

Note that, when the amount of various characteristics relating to audio data calculated by the audio classification unit 141 (e.g., amount of conversation detection characteristic, amount of laughter detection characteristic, amount of cheering detection characteristic, amount of onomatopoeia detection characteristic, amount of music detection characteristic) has reached or exceeded a predetermined threshold value, the recognized audio data is stored in the storage unit 115 or the like.

The audio recognition unit 143 is realized by, for example, a CPU, a ROM, a RAM, a communication unit, and the like. The audio recognition unit 143 analyzes the audio data by a known audio recognition process and a known language recognition process, converts the content of the audio data into text data, or recognizes the content of the audio data itself. Accordingly, it is possible to identity the content of audio data and various words included in the audio data.

The results of processes performed by respective processing units described above are output to the Information acquisition unit 101, the image analysis unit 121, the place/activity analysis unit 125, and the context recognition unit 127 whenever necessary.

Note that the detailed method of the various analysis/recognition processes performed by respective processing units described above is not limited in particular, and known methods such as that disclosed in JP 2010-191934A, for example, may be used. In addition, the audio analysis unit 123 may perform the aforementioned audio recognition process, using the service providing server 5 connected on the network 1 and configured to provide an audio recognition service.

Returning to FIG. 3 again, the place/activity analysis unit 125 included in the recognition processing unit 103 according to the present embodiment will be described.

The place/activity analysis unit 125 is realized by, for example, a CPU, a ROM, a RAM, a communication unit, and the like. The place/ activity analysis unit 125 analyzes the location information acquired by the information acquisition unit 101 or the information output from an acceleration sensor or the like to identify the place where the user is present, or the content of the activity being performed by the user.

Figure 6:
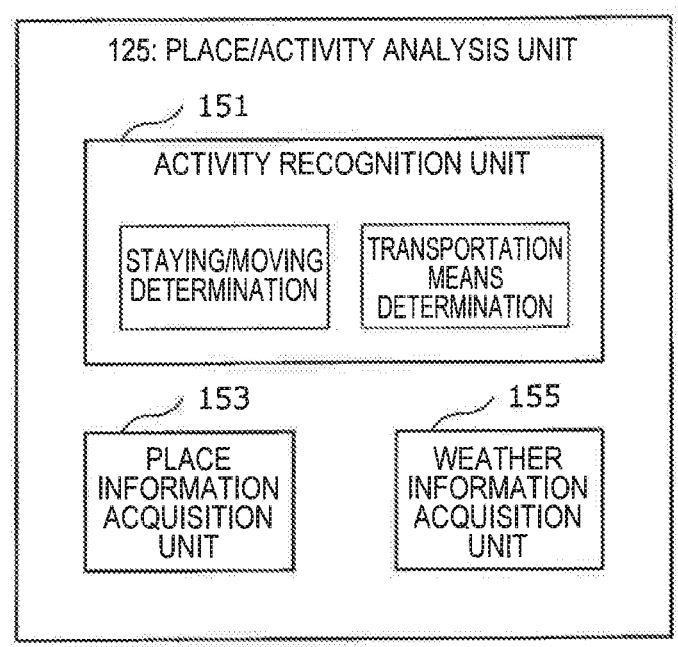
FIG. 6 is a block diagram illustrating an exemplary configuration of a place/activity analysis unit included in the recognition processing unit according to the embodiment.

The place/activity analysis unit 125 further includes, as illustrated in FIG. 6, an activity recognition unit 151, a place information acquisition unit 153, a weather information acquisition unit 155, and the like.

The activity recognition unit 151 is realized by, for example, a CPU, a ROM, a RAM, a communication unit, and the like. The activity recognition unit 151 analyzes the location information acquired by the information acquisition unit 101 or the information output from the acceleration sensor or the like to calculate the amount of characteristic characterizing the user's activity. In addition, the activity recognition unit 151 further uses the calculated amount of characteristic to recognize the content of the activity being performed by the user. Accordingly, the activity recognition unit 151 may determine whether the user is slaying or moving, or determine the transportation means used by the user to move around. As a result, the activity recognition unit 151 may grasp the user's state such as whether the user is walking, running, resting, jumping, moving on an elevator, or moving on a car, a train or a bicycle.

Figure 7:
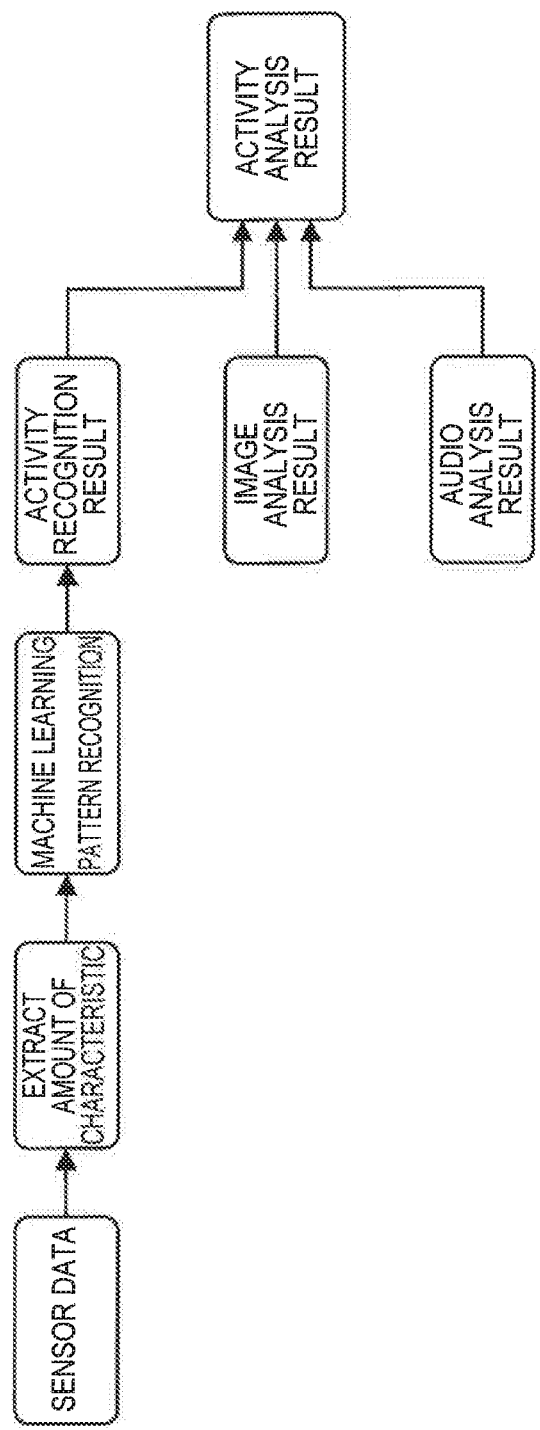
FIG. 7 is an explanatory diagram illustrating a place/activity analysis process performed by a recognition processing unit according to the embodiment.

An exemplary activity recognition process performed by the activity recognition unit 151 will be briefly described, referring to FIG. 7. FIG. 7 is an explanatory diagram schematically illustrating the exemplary activity analysis process.

The activity recognition unit 151 first uses motion sensor data such as acceleration/gyro to extract the amount of characteristic from sensor data by performing known signal processing such as calculating the average, variance, frequency filter response on such sensor data. In addition, the activity recognition unit 151 may recognize a person's movement, posture, vehicle or the like, using known machine learning/pattern recognition techniques such as boosting, neural network, Hidden Markov Model (HMM).

In addition, the activity recognition unit 151 may, use the image data and the audio data (or the result of analysis by the image analysis unit 121 or the audio, analysis unit 123) as illustrated in FIG. 7 in order to further improve the recognition precision.

Details of the aforementioned activity recognition process performed by the activity recognition unit 151 are not limited in particular, and known methods such as that disclosed in JP-2010-198595A, for example, may be used. In addition, the activity recognition unit 151 may perform the aforementioned activity recognition process, using the service providing server 5 connected on the network 1 and configured to provide an activity recognition service.

Figure 8:
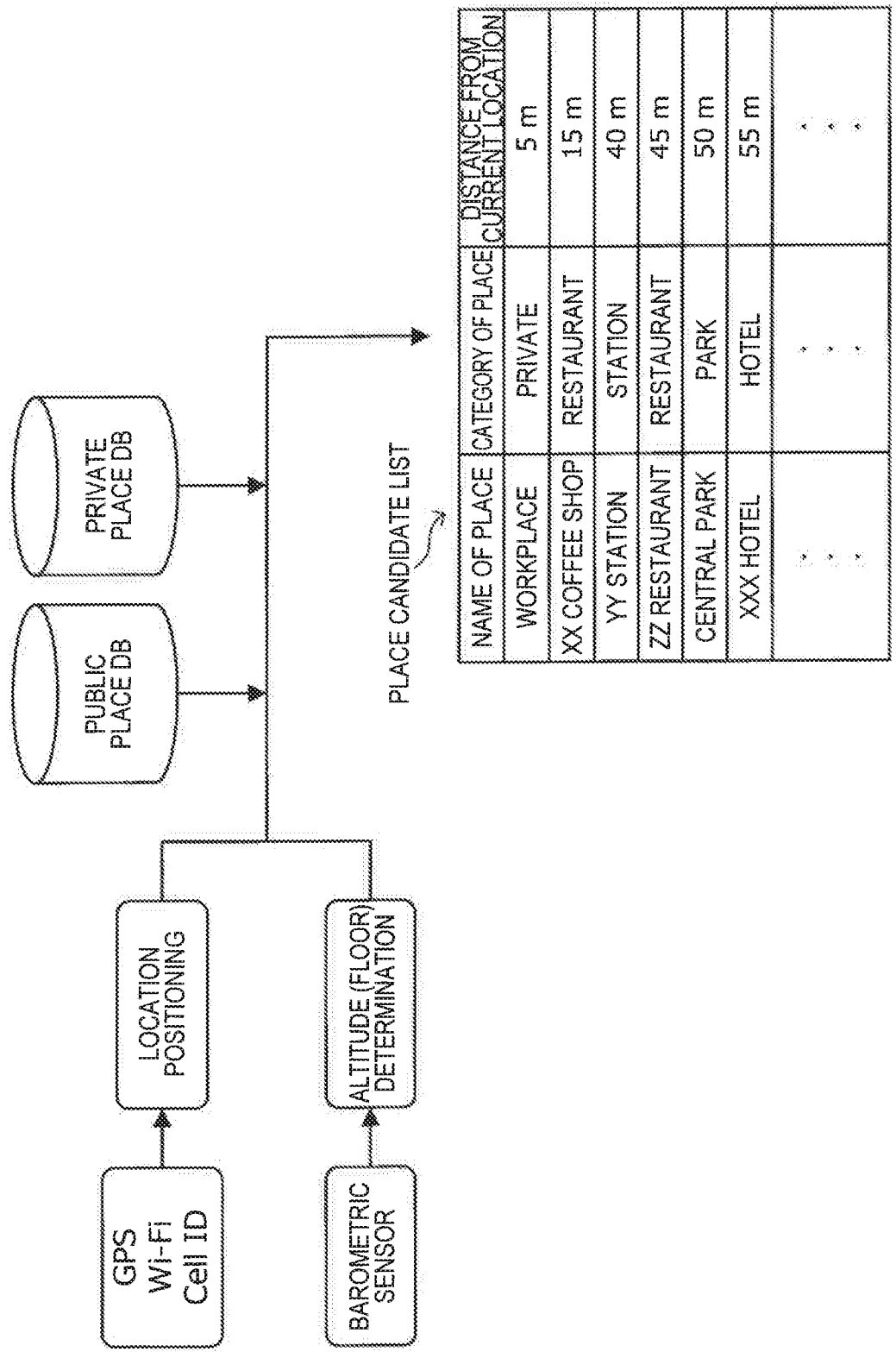
FIG. 8 is an explanatory diagram illustrating a place/activity analysis process performed by a recognition processing unit according to the embodiment.
Figure 9:
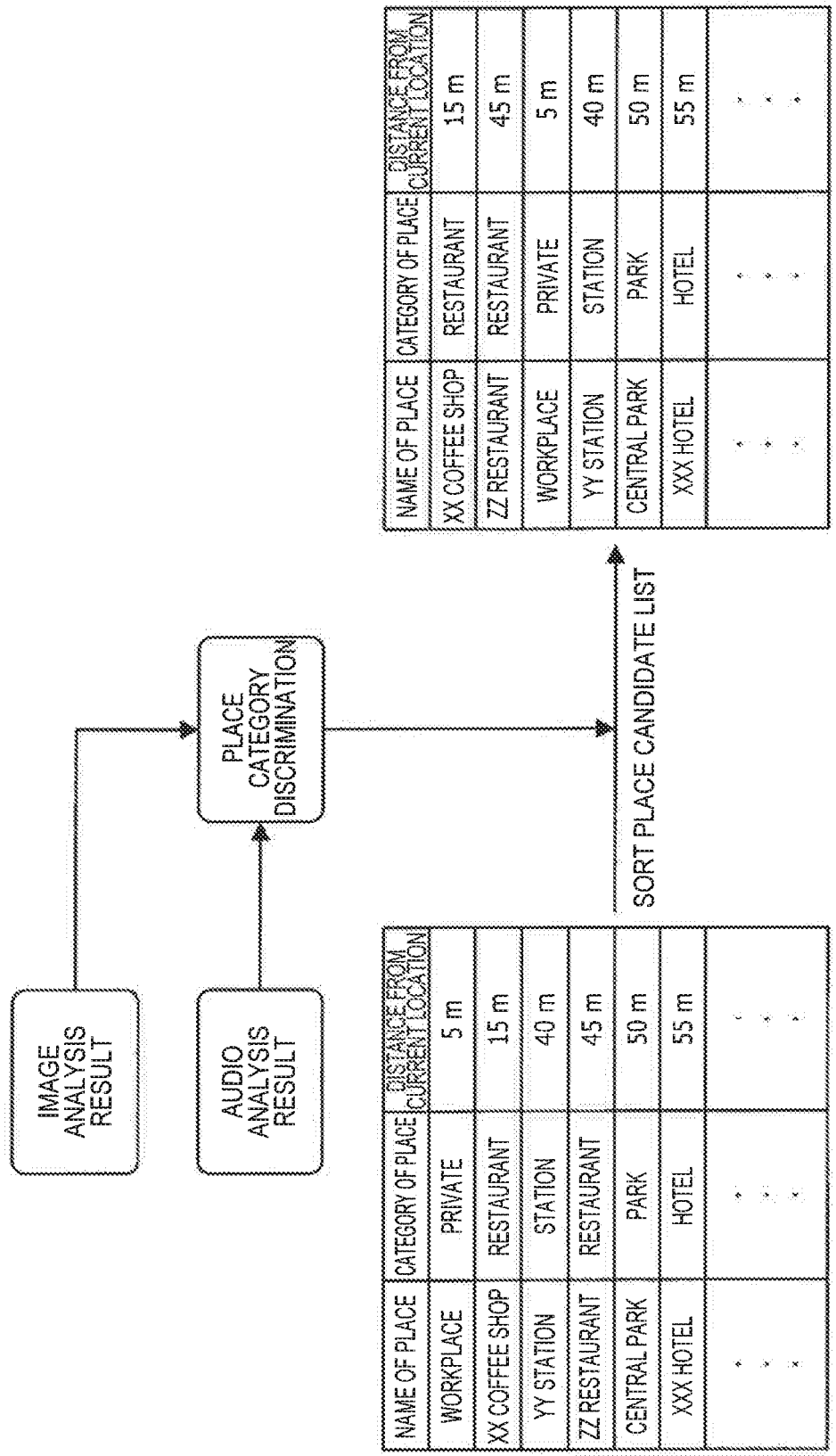
FIG. 9 is an explanatory diagram illustrating a place/activity analysis process performed by a recognition processing unit according to the embodiment.

The place information acquisition unit 153 is realized, by, for example, a CPU, a ROM, a RAM, a communication unit, and the like. The place information acquisition unit 153 analyzes the location information acquired by the information acquisition unit 101 or the information output from a barometric sensor or the like to acquire place information representing the place where a user is present, using the service providing server 5 or the like that provides a place acquisition service as necessary. In the following, a place information acquisition process performed by the place information acquisition unit 153 will be specifically described, referring to FIGS. 8 and 9. FIGS. 8 and 9 are explanatory diagrams illustrating the place information acquisition process.

The place information acquisition unit 153 searches a place database stored in the storage unit 115 or the like (or various servers existing on the network 1), on the basis of the information representing the latitude and the longitude among the place information acquired by the information acquisition unit 101. It is preferable that there exist in the place database, as illustrated in FIG. 8, a private place database (abbreviated as "DB", in the following) storing private places such as houses, workplaces and schools, and a public place DB storing public places such as restaurants, coffee shops, stations, stores and parks.

Next, the place information acquisition unit 153 generates a place candidate list illustrated in FIG. 8, within a range (latitude and longitude of the current location +a radius of several to tens of meters) according to a latitudinal or longitudinal error, referring to the private place DB and the public place DB. As illustrated in FIG. 8, the data representing respective places has names and categories of the places associated with each other.

When generating such a place candidate list, the place information acquisition unit 153 may determine the altitude (floor of a building or the like, to be more specific) to narrow down the place candidate list, using the output from the barometric sensor or the like.

The place candidate list generated in the aforementioned manner is usually not uniquely determined in the urban area and may include several to tens of place candidates, as illustrated in FIG. 8.

Next, the place information acquisition unit 153 uses the image data and the audio data (or the result of analysis by the image analysis unit 121 and the audio analysis unit 123) as illustrated in FIG. 9 in order to recognize and define the place.

For example, the place information acquisition unit 153, using a technique for classifying scenes from the image data (e.g., generating a discriminator from the image data preliminarily collected in large amounts using machine learning), classifies scenes of restaurants, coffee shops, stations, stores, parks, houses, workplaces, schools and the like, and calculates scores of respective scenes. On this occasion, the image scene classification may use depth information as the amount of characteristic besides color/brightness. In addition, the place information acquisition unit 153 classifies audio scenes such as conversation, laughter and music, using a technique for classifying audio (e.g., preliminarily collecting samples and generating a discriminator by machine learning), and calculates scores of respective audio scenes.

Next, the place information acquisition unit 153 inputs the image scene classification scores and the audio scene classification scores to a place category discriminator. Such a place category discriminator discriminates the place category to be a "restaurant" on the basis of a preliminarily and statistically learned result when, for example, the image scene classification score of "restaurant" and the audio classification score of "conversation" are both high.

Note that the place information acquisition unit 153 may cooperate the image analysis unit 121 and the audio analysis unit 123 performing a similar process to use the result of analysis by the image analysis unit 121 and the audio analysis unit 123 as appropriate, without performing a process that uses the discriminator as described above.

Using the discrimination result of the place category acquired as described above, the place information acquisition unit 153 sorts the generated place candidate list. In the example illustrated in FIG. 9, the discrimination result of the place changes from "workplace" to "XX coffee shop".

Performing the process described above allows the place information acquisition unit 153 to acquire the place information representing the place where the user is present.

Returning to FIG. 6 again, the weather information acquisition unit 155 will be briefly described.

The weather information acquisition unit 155 is realized by, for example, a CPU, a ROM, a RAM, a communication unit, and the like. The weather information acquisition unit 155 acquires various weather information (meteorological information) such as weather, highest temperature, lowest temperature, probability of precipitation, wind velocity, humidity, atmospheric pressure of the place where the user is present, using the service providing server 5 (e.g., a weather forecast providing server) or the like providing a weather information acquisition service. Using the weather information acquired in this manner, the place/activity analysis unit 125 may increase the precision of the analysis process to be performed.

The results of processes performed by respective processing units described above are output to the information acquisition unit 101, the image analysis unit 121, the audio analysis unit 123, and the context recognition unit 127 whenever necessary.

Returning to FIG. 3 again, the context recognition unit 127 included in the recognition processing unit 103 according to the present embodiment will be described.

The context recognition unit 127 is realized by, for example, a CPU, a ROM, a RAM, a communication unit, and the like. The context recognition unit 127 uses various analysis results relating to the user environment acquired by the image analysis unit 121, the audio analysis unit 123, the place/activity analysis unit 125, or the like, to recognize the context surrounding the user.

Here, "context surrounding the user" refers to the user's life-level activity estimated by performing a further recognition process on the basis of the result of analysis relating to "time", "place" and "activity", with the "time", "place" and "activity" being combined in a hybrid manner. As an example of such a context, there may be mentioned eating, shopping, working, meeting a person, travelling, playing, sports, moving, housework, appreciating artworks, relaxing, sleeping, etc.

Figure 10:
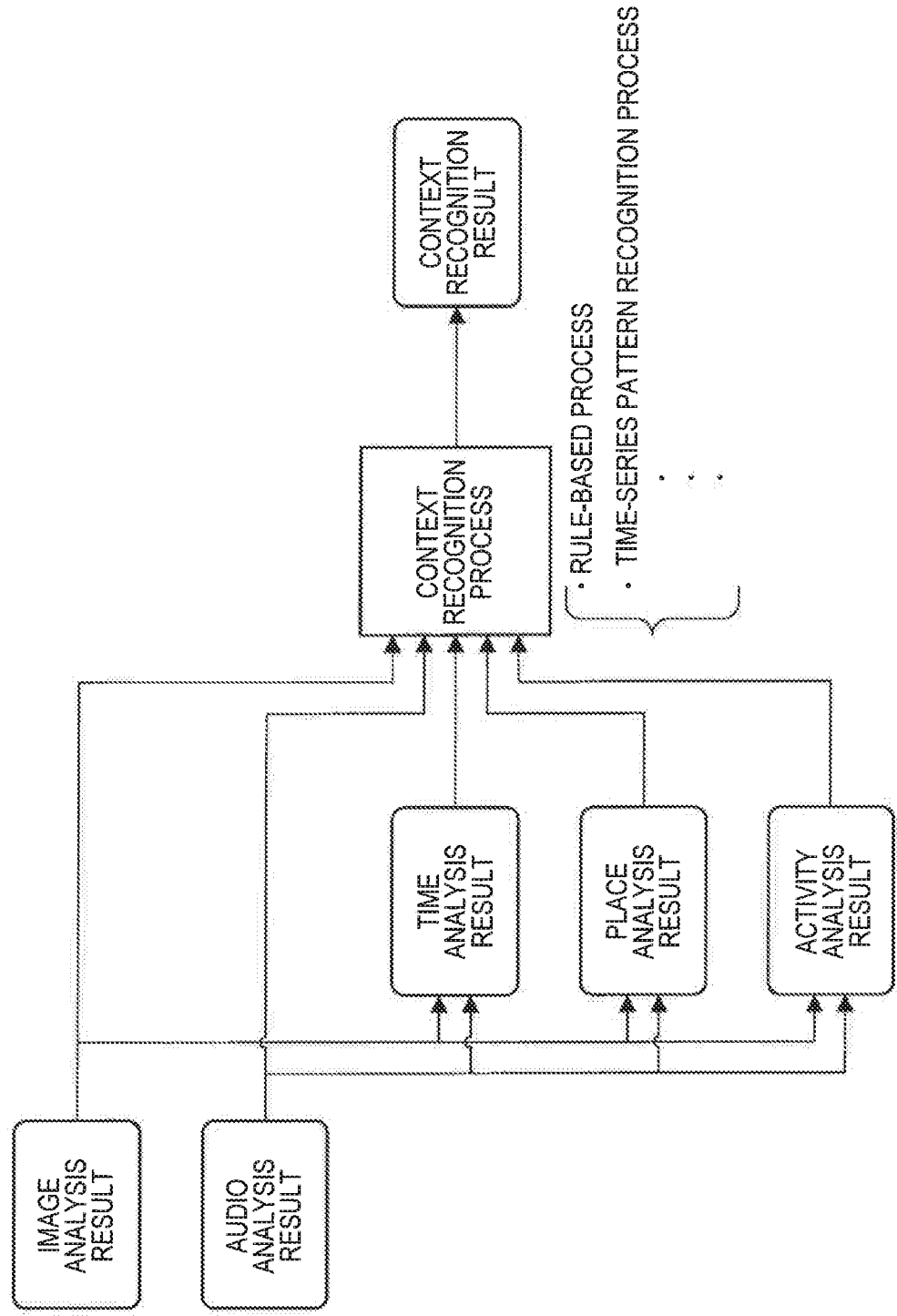
FIG. 10 is an explanatory diagram illustrating a context recognition process performed by the recognition processing unit according to the embodiment.

Specifically, the context recognition unit 127 recognizes the context surrounding the user by using the results of image analysis, audio analysis, time analysis, place analysis, and activity analysis, as schematically illustrated in FIG. 10, and applying methods such as a rule-based process, the time-series pattern recognition process, or the like. In addition, the context recognition unit 127 outputs information representing the result of context recognition to the context candidate information generating unit 105 described below each time the context surrounding the user changes.

Here, the information relating to time, among the time analysis results illustrated in FIG. 10, may be acquired by referring to the time information held by the information processing apparatus 10. In addition, the context recognition unit 127 may use such time information and general prior knowledge to determine what the context of the current time is like. For example, when a day of interest falls on Monday to Friday, it is possible to identify the day of interest as a weekday, or as a weekend when the day of interest is either Saturday or Sunday. In addition, it is determined to be morning when, for example, the time of day in question lies between 6 and 11 o'clock, determined to be afternoon when the time of day in question lies between 12 and 15 o'clock, determined to be evening when the time of day in question lies between 16 and 18 o'clock, and determined to be night when the time of day in question lies between 19 and 5 o'clock of the next day.

Furthermore, the context recognition unit 127 may also identity the user's usual activity pattern on the basis of the user's activity history and determine the context of the time of day specific to the user. For example, it is possible to determine, on the basis of the usual activity pattern, the time zone of 8 to 9 o'clock on Monday to Friday to be commuting time, the lime zone of 9 to 18 o'clock on Monday to Friday to be work time, and the time zone of 20 to 21 o'clock on Saturday to be dinner time.

In addition, the result of image analysis illustrated in FIG. 10 may use the result of analysis performed by the image analysis unit 121, and the result of audio analysis illustrated in FIG. 10 may use the result of analysis performed by the audio analysis unit 123. In addition, the results of place analysis and activity analysis illustrated in FIG. 10 may use the result of analysis performed by the place/activity analysis unit 125.

Here, the rule-based process, among the context recognition processes performed by the context recognition unit 127, is a process of applying the IF-THEN rule to respective analysis results relating to "time", "place" and "activity", and determining a context corresponding to the rule having satisfied the condition to be the context surrounding the user. For example, it may be determined that, on the basis of the rule-based process, "the user is 'working' when the user is in the user's workplace and sitting during work time", "the user is 'eating' when the user is in a restaurant around noon and a dish exists in the image data", "the user is 'shopping' when the user is walking around in a supermarket on the way home", "the user is 'travelling' when the user is at a place far away from his workplace".

In addition, the time-series pattern recognition process, among the context recognition processes performed by the context recognition unit 127, is a type of machine learning technology such as the Hidden Markov Model method, which is a technique suitable for modeling of temporal patterns. The process is an approach of recognizing the context surrounding the user by preliminarily teaching a stochastic model characterizing each context using a large amount of learning data and substituting, into a pre-constructed stochastic model, the input data to the context recognition unit 127.

Figure 11:
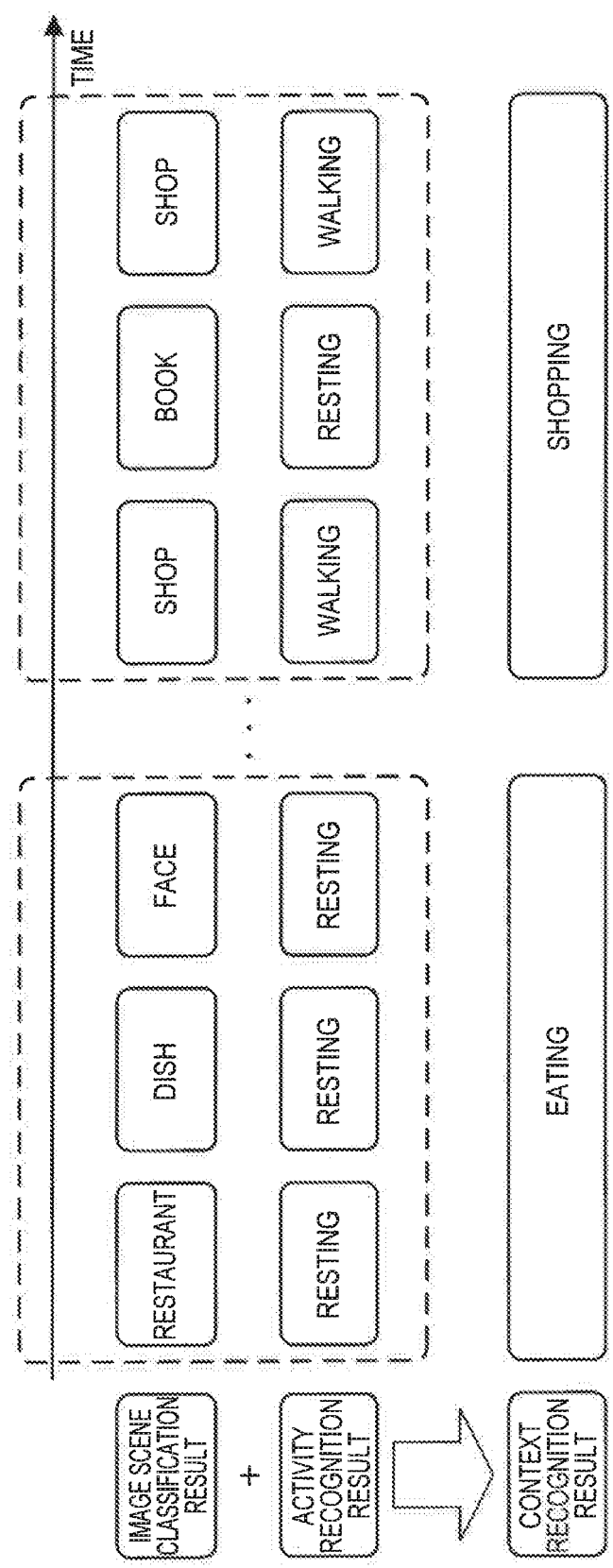
FIG. 11 is an explanatory diagram illustrating a context recognition process performed by the recognition processing unit according to the embodiment.

Using the aforementioned approach, the context recognition unit 127 determines that the user is "eating" on the basis of the stochastic model, when the result of image scene classification transitions in the order of "restaurant→cooking →face" and the result of activity recognition transitions in the order of "resting→resting→resting", as illustrated in FIG. 11 for example. When, in addition, the result of image scene classification transitions in the order of "store→book store" and the result of activity recognition transitions in the order of "walking→resting →walking", the context recognition unit 127 determines that the user is "shopping" on the basis of the stochastic model.

An exemplary context recognition result acquired in the aforementioned manner is illustrated in FIGS. 12A and 12B. As illustrated in FIGS. 12A and 12B, various recognition results acquired by the recognition processing unit 103 include respective results of analysis processes performed by the image analysis unit 121, the audio analysis unit 123 and the place/activity analysis unit 25, and results of context recognition acquired by combining the results of analysis processes (i.e., high-level context).

The information representing the result of context recognition illustrated in FIGS. 12A and 12B is output from the context recognition unit 127 to the context candidate information generating unit 105 whenever necessary.

Context Candidate Information Generating Unit 105

Returning to FIG. 2 again, the context candidate information generating unit 105 according to the present embodiment will be described in detail.

The context candidate information generating unit 105 uses the result of context recognition performed by the recognition processing unit 103 to generate context candidate information representing a candidate of the context surrounding the user including at least information representing the context surrounding the user and information representing the user's emotion in the, context. In the following, a context candidate information generating process performed by the context candidate information generating unit 105 will be specifically described, referring to FIGS. 13 to 16.

Figure 13:
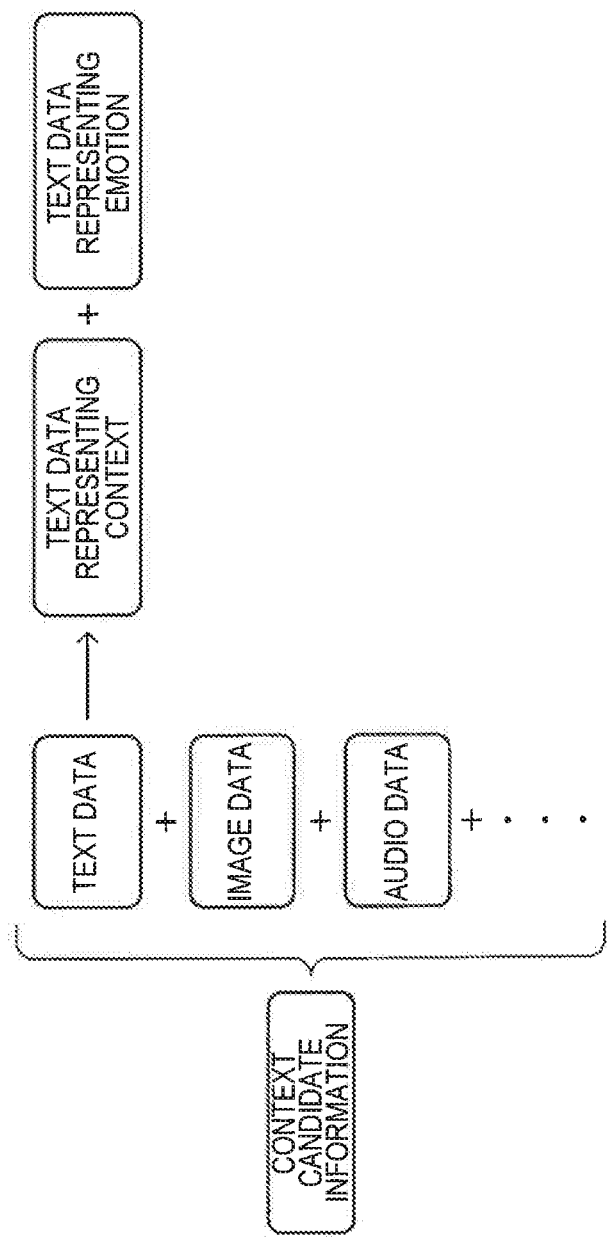
FIG. 13 is an explanatory diagram illustrating a context candidate information generating process performed by a context candidate information generating unit included in the information processing apparatus according to the embodiment.

The context candidate information generated by the context candidate information generating unit 105 includes at least text data formed by text data representing the context and text data representing the emotion, as also illustrated in FIG. 13. The context, candidate information generating unit 105 according to the present embodiment is able to generate an expressive and natural sentence by adding an expression representing an emotion.

In addition, the context candidate information may also, include image data and audio data used for the analyses, as also illustrated in FIG. 13. In addition, various data representing the context surrounding the user may also be attached, besides text data, image data and audio data.

Figure 14A:
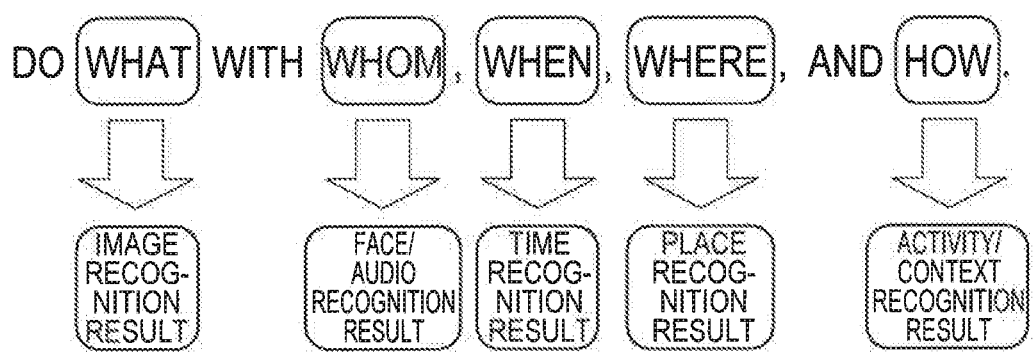
FIG. 14A is an explanatory diagram illustrating a context candidate information generating process performed by the context candidate information generating unit according to the embodiment.

Here, the text data automatically generated by the context candidate information generating unit 105 to represent the context is formed by a sentence like, "do 'what' with 'whom', 'when', 'where', and show"; as illustrated in FIG. 14A. Here, the information acquired from the result of time recognition is applied to the part expressing "when" in the text data representing the context, and the information acquired from the result of place recognition is applied to the part expressing "where". In addition, the information acquired from the results of face recognition and audio recognition is applied to the part expressing "who" in the text data representing the context, and the information acquired from the result of image analysis is applied to the part expressing "what". Furthermore, not only the information acquired from the result of activity recognition but also the information acquired front the result of context recognition subsequently performed in a hybrid manner is applied to the part expressing "how" in the text data representing the context.

Note that, when generating a sentence intended to be posted to the information posting server 3, the result of time recognition corresponding to "when" is not usually very important. Accordingly, whether or not to apply the result of time recognition corresponding to "when" in a sentence, may be, determined as appropriate. However, there may be a case, where focusing on the result of time, recognition allows for grasping whether the recognized time is before, in the middle of, or after a certain activity. In such a case, the context candidate information generating unit 105 may use the result of time recognition so as to appropriately select the tense (i.e., present, past, future, perfect, etc.) of the sentence to be automatically generated.

A case may also arise where no analysis result corresponding to the so-called 5W1H, namely, "when", "where", "who", "what" and "how" exists in the results of analysis and context recognition of the user environment output from the recognition processing unit 103. Therefore, it suffices that the context candidate information generating unit 105 corrects the sentence to be automatically generated as appropriate so as to generate a natural sentence, in a case where a part of the analysis results is not acquired as illustrated in FIG. 14B.

On the other hand, the information representing an emotion according to the present embodiment is generated by simplifying and expressing the emotion felt by the user into N types and switching sentence candidates according to the context. Accordingly, the context candidate information generating unit 105 generates text data representing an emotion using an emotion representation table illustrated in FIG. 15. In the emotion representation table illustrated in FIG. 15, the column direction of the table corresponds to the emotion simplified into N types (three types in FIG. 15), and the row direction of the table corresponds to results of context recognition.

The extent to which the emotion, is simplified is not limited in particular, and may be set as appropriate, as illustrated in FIG. 16, for example. FIG. 16 illustrates a case where the degrees of emotion are classified into N types and the types of emotion are classified into N types.

Simplifying the emotion into N types as illustrated in FIG. 16 allows for appropriately generating a sentence reflecting the user's emotion at the time, for example, on the basis of a minimum user input such as selecting N types of buttons by the user, or emotion sensing using biosensors such as perspiration, heartbeat or temperature sensors.

In addition, switching sentence candidates representing the emotion in accordance with the context allows for selecting the optimal expression suited for the context, making it possible to generate a natural sentence. Furthermore, as illustrated in FIG. 15, assigning a plurality of sentence candidates to a single context allows for increasing the variation of sentences. Increased variation of sentences also allows for generating a sentence expected to prevent the user from being bored.

Such an emotion representation table may be preliminarily prepared by known methods. In addition, the emotion representation table may be personalized using sentences posted to a social network service by the user, or the user's remarks.

Using the aforementioned method, the context candidate information generating, unit 105 generates context candidate information on the basis of the result of context recognition and the emotion representation table, each time the context surrounding the user changes. Subsequently, the context candidate information generating unit 105 outputs the generated context candidate information to the display control unit 107 for display to the user.

Display Control Unit 107

Returning to FIG. 2 again, the display control unit 107 included in the information processing apparatus 10 according to the present embodiment will be described.

The display control unit 107 is realized by, for example, a CPU, a ROM, a RAM, an output device, a communication unit, and the like. The display control unit 107 performs display control when displaying various processing results including context candidate, information output from the context candidate information generating unit 105 on an output device such as a display included in the, information processing apparatus 10 or an output device provided outside the information processing apparatus 10, or the like. Accordingly, the recognition result performed by the recognition processing unit 103 and the context candidate information generated by the context candidate information generating unit 105 will be displayed on a predetermined area of the display screen subjected to display control by the display control unit 107. The user of the information processing apparatus 10, may grasp, on the spot, various processing results such as context candidate information automatically generated by the information processing apparatus 10.

Context Information Transmitting Unit 109

The context information transmitting unit 109 is realized by, for example, a CPU, a ROM, a RAM, a communication unit, and the like. The context information transmitting unit 109 transmits the pieces of information selected by the user from the context candidate information generated by the context candidate information generating unit 105 to the information posting server 3 providing a social network service, as context information representing the context surrounding the user. Accordingly, only the context information desired to be posted by the user is posted to various social network services. As a result, posting becomes easier for the user without having to prepare information relating to the context surrounding the user by himself or herself.

Information Updating Unit 111

Figure 17:
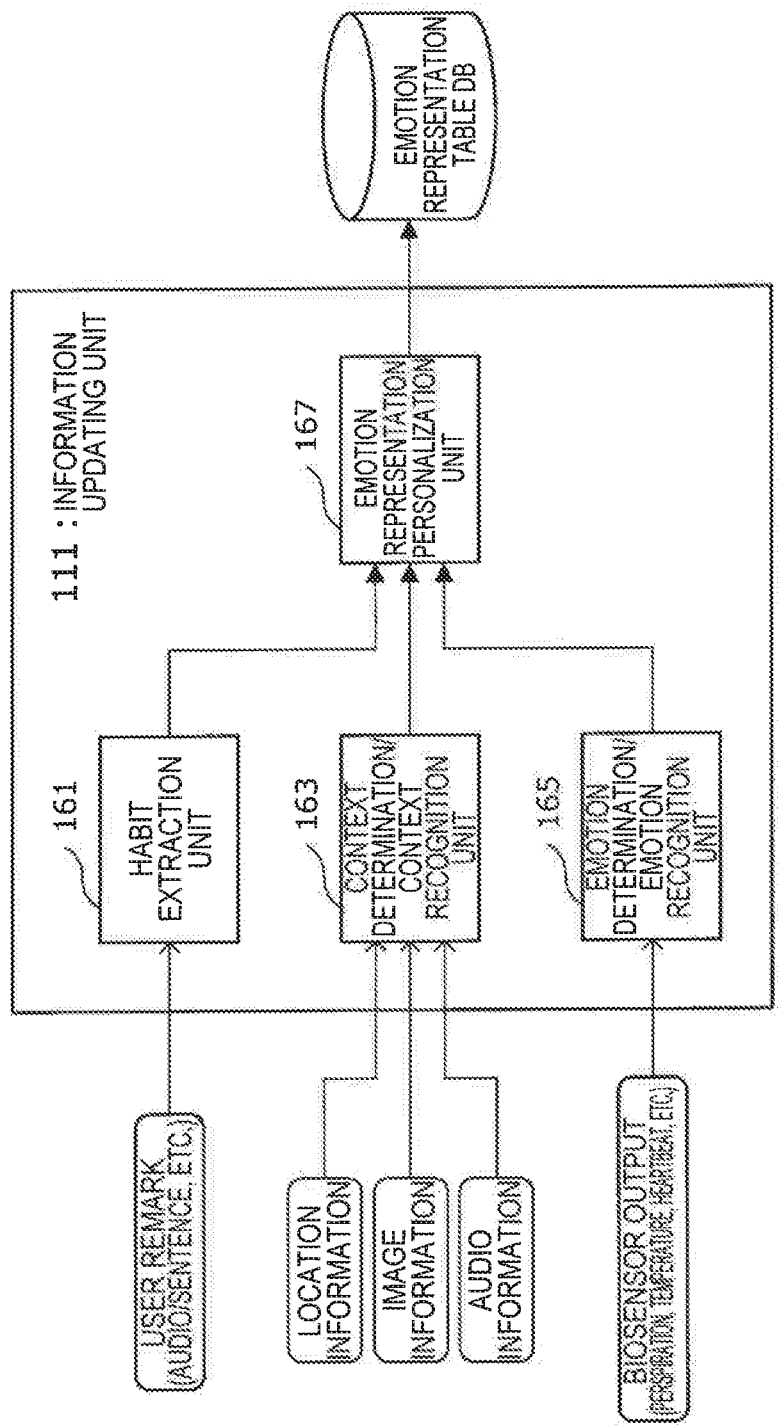
FIG. 17 is a block diagram illustrating an exemplary configuration of an information updating unit included in the information processing apparatus according to the embodiment.

The information updating unit 111 is realized by, for example, a CPU, a ROM, a RAM, a communication unit, and the like. The information updating unit 111 updates the expression representing the user's emotion included in emotion representation table, using, at least any of: the result of analysis relating to the user environment by the recognition processing unit 103; remarks or sentence expressions provided by the user; and the output from, the sensor provided in the information processing apparatus 10. In the following, an exemplary configuration of the information updating unit 111 according to the present embodiment will be briefly described, referring to FIG. 17. FIG. 17 is a block diagram illustrating an exemplary configuration of the information updating unit included in the information processing apparatus according to the present embodiment.

The information processing apparatus 10 according to the present embodiment customizes the emotion representation table used by the context candidate information generating unit 105 for generating text data representing an emotion to an emotion representation table personalized for the individual user, using at least the content of the user's remarks. Accordingly, the content of the context candidate information automatically generated by the context candidate information generating unit 105 is provided with reality as if the user has created it by himself or herself.

The information updating unit 111 described above has at least a habit extraction unit 161 and an emotion representation personalization unit 167, and more preferably, at least either a context determination/context recognition unit 163 or emotion determination/emotion recognition unit 165, as illustrated in FIG. 17.

The habit extraction unit 161 is realized by, for example, a CPU, a ROM, a RAM, a communication unit, and the like. The habit extraction unit 161 extracts the user's habit such as frequently used words, frequently used phrases, dialect, refrains or the like, from the user's everyday remarks according to remarks or sentence expressions provided by the user (i.e., the user's voice or texts converted from the user's voice, or sentences created by the user).

Here, audio data or conversation over a telephone acquired via a microphone provided in the information processing apparatus 10 may be used as the user's voice to be used for habit extraction. In addition, emails created by the user, content posted to a social network service, or the like, may be used as the sentence expressions provided by the user.

The method of extracting the user's habit from the aforementioned data is not limited in particular, and it suffices to use various statistical processes, machine learning techniques, pattern recognition techniques, or the like, as appropriate.

The information relating to the user's habit extracted by the habit extraction unit 161 is output to the emotion representation personalization unit 167.

The context determination/context recognition unit 163 is realized by, for example, a CPU, a ROM, a RAM, a communication unit, and the like. The context determination/context recognition unit 163 uses remarks or sentence expressions provided by the user to determine the context referring to a dictionary of words appearing in each of preliminarily registered contexts, or uses the result of analysis relating to the user environment performed by the recognition processing unit 103 to recognize the context. Accordingly, the context determination/context recognition unit 163 may identify the type context (e.g., eating, working, etc.) in which the user has provided the remark or sentence expression of interest. The context determination/context recognition unit 163 outputs the information relating, to the acquired context to the emotion representation personalization unit 167. Accordingly, the emotion representation personalization unit 167 described below may personalize the emotion according to the context acquired by the context determination/context recognition unit 163, in addition to the user's habit extracted by the habit extraction unit 161.

Note that the method of determining or recognizing the context is not limited in particular, and any known methods may be used, or such a determination/recognition process may be performed by cooperating with the service providing server 5 connected to the network 1. In addition, the functions of the context determination/context recognition unit 163 may be realized through cooperation with the recognition processing unit 103.

The emotion determination/emption recognition unit 165 is realized by, for example, a CPU, a ROM, a RAM, a communication unit, and the like. The emotion determination/emotion recognition unit 165 uses remarks or sentence expressions provided by the user to determine the emotion referring to a dictionary of words appearing in each of preliminarily registered emotions, or uses the output from a sensor provided in the information processing apparatus 10 (e.g., output from a biosensor relating to perspiration, temperature, heartbeat, etc.) to recognize the emotion. Accordingly, the emotion determination/emotion recognition unit 165 may identify the type of emotion (e.g., happy, tired, etc.) when the remark or sentence expression of interest is provided. The emotion determination/emotion recognition unit 165 outputs acquired information relating to the emotion to the emotion representation personalization unit 167. Accordingly, the emotion representation personalization unit 167 described below may personalize the emotion according to the emotion acquired by the emotion determination/emotion recognition unit 165, in addition to the user's habit extracted by the habit extraction unit 161.

Note that the method of determining or recognizing the emotion is not limited in particular, and any known methods may be used, or such a determination/recognition process may be performed by cooperating with the service providing server 5 connected to the network 1.

The emotion representation personalization unit 167 is realized by, for example, a CPU, a ROM, a RAM, and the like. The emotion representation personalization unit 167 further uses the information relating to the user's habit output from the habit extraction unit 161, preferably the information, relating to the context and emotion, to customize the emotion representation table stored in a database relating to the emotion representation table. Accordingly, when using only information relating to the user's habit output from the habit extraction unit 161, phrases in the entre emotion representation table may be customized on the basis of a knowledge that "the user has a habit of putting the words 'you know' at the end of the phrase", for example. When, alternatively, the information relating to context and emotion is also used, phrases in the entre emotion representation table may be customized on the basis of knowledge that "the user frequently uses the expression 'reeeally yummy!' when pleased while eating".

External Device Cooperation Unit 113

Returning to FIG. 2 again, the external device cooperation unit 113 included in the information processing apparatus 10 according to the present embodiment will be described.

Figure 18:
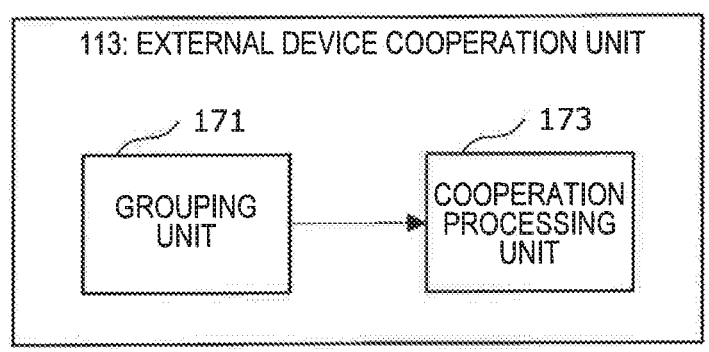
FIG. 18 is a block diagram illustrating an exemplary configuration of an external device cooperation unit included in the information processing apparatus according to the embodiment.

The external device cooperation unit 113 is realized by, for example, a CPU, a ROM, a RAM, a communication unit, and the like. The external device cooperation unit 113 cooperates with another information processing apparatus 10 with which mutual communication is possible so as to improve the precision of, or share, the result of generation of the context candidate information performed by the context candidate information generating unit 105. In the following, an exemplary configuration of the external device cooperation unit 113 according to the present embodiment will be briefly described, referring to FIGS. 18 and 19. FIG. 18 is a block diagram illustrating an exemplary configuration of the external device cooperation unit included in the information processing apparatus according to the present embodiment, and FIG. 19 is an explanatory diagram illustrating an external device cooperation process performed by the external device cooperation unit according to the present embodiment.

The external device cooperation unit 113 has a grouping unit 171 and a cooperation processing unit 173, as illustrated in FIG. 18.

The grouping unit 171 is realized by, for example, a CPU, a ROM, a RAM, a communication unit, and the like. The grouping unit 171 uses the result of face recognition performed by the recognition processing unit 103 and an address book having described therein various information relating to the user's acquaintances and friends stored in the storage unit 115 of the information processing apparatus 10, or the like, to group other information processing apparatuses 10 coexisting in a place where the information processing apparatus 10 ,is present. It is very likely that a plurality of users carrying the information processing apparatuses 10 sharing the place will participate, in the same event, together (e.g., participating in a meal meeting), and therefore grouping the information processing apparatuses 10 allows for efficiently improving the precision of, or sharing the result of generation of the context candidate information generated by the information processing apparatus 10.

The cooperation processing unit 173 is realized by, for example, a CPU, a ROM, a RAM, a communication unit, and the like. The cooperation processing unit 173 improves the precision of, or share the context candidate information among the plurality of information processing apparatuses 10 which have been grouped by the grouping unit 171.

For example, let us assume a context in which four users are eating. In such a case, the information processing apparatuses 10 carried by the four users are supposed to capture images of the same dish content from various directions, and therefore capable of sharing or improving the precision of information by exchanging the information among the grouped information processing apparatuses 10.

Let us assume that, as illustrated in FIG. 19 for example, the devices carried by people A and B have generated a context recognition result that they are "eating 'Udon'", and the device carried by a person C has generated a context recognition result that he or she is "eating 'ramen'", whereas the device carried by a person D has not performed context recognition for some, reason. In such a case, cooperation of the external device cooperation units 113 of the respective information processing apparatuses 10 with each other allows for improving the precision of the recognition result performed by the device of the person C, for example, to "eating 'Udon'" on the basis of the principle of majority rule, or providing the device of the person D with the majority result of context recognition.

On this occasion, the cooperation processing unit 173 may not only share texts expressing the context but also may share image data, other various metadata, or the like.

Storage Unit 115

Returning to FIG. 2 again, the storage unit 115 included in the information processing apparatus 10 according to the present embodiment will be described.

The storage unit 115 is realized by, for example, a RAM, a storage device, or the like included in the information processing apparatus 10 according, to the present embodiment. The storage unit 115 stores various content data such as image data, audio data, or the like, generated by the information processing apparatus 10. In addition, the storage Unit 115 has stored therein various object data to be displayed on the display Screen. The object data mentioned here includes, for example, any type of parts forming a graphical user interface (GUI) such as icons, buttons, thumbnails, or the like.

In addition, the storage unit 115 stores, whenever necessary, various parameters or intermediate results of processes which have become necessary to be stored when the information processing Operating 10 according to the present embodiment performs a Certain process, or various databases and programs, or the like. The storage unit 115 may be freely accessed for reading and writing of data by the information acquisition unit 101, the recognition processing unit 103, the context candidate information generating unit 105, the display control unit 107, the context information transmitting unit 109, the information updating unit 111, the external device cooperation unit 113, and the like.

An exemplary function of the information processing apparatus 10 according to the present embodiment has been described above, Each of the aforementioned components may be configured using general-purpose members or circuits, or may be configured by hardware specific to the function of each component. In addition, all the functions of respective components may be performed by the CPU or the like. Therefore, the configuration to be used may be changed as appropriate, according to the technical level at the time of implementing the present embodiment.

Note that it is possible to create, and load on a personal computer or the like, computer programs for realizing respective functions of the information processing. apparatuses according to the present embodiment described above. In addition, it is possible to provide a computer-readable storage medium storing such computer, programs. The storage medium may be, for example, a magnetic disk, an optical disk, a magneto-optical disk, a flash memory, or the like. In addition, the aforementioned computer programs may be distributed via a network, for example, without using a storage medium.

<Exemplary Variation of Information Processing Apparatus>

Figure 20A:
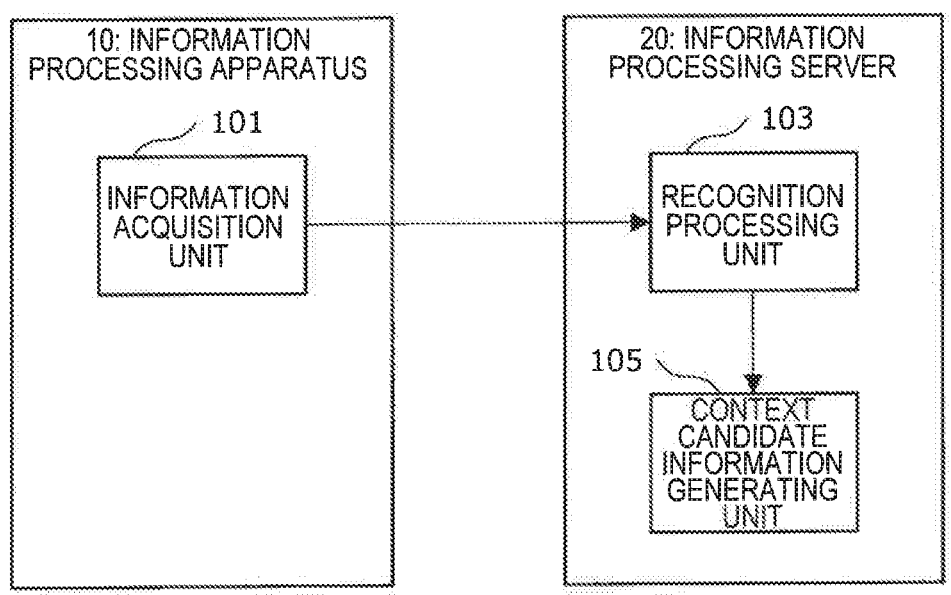
FIG. 20A is an explanatory diagram illustrating an exemplary variation of the information processing apparatus according to the embodiment.
Figure 20B:
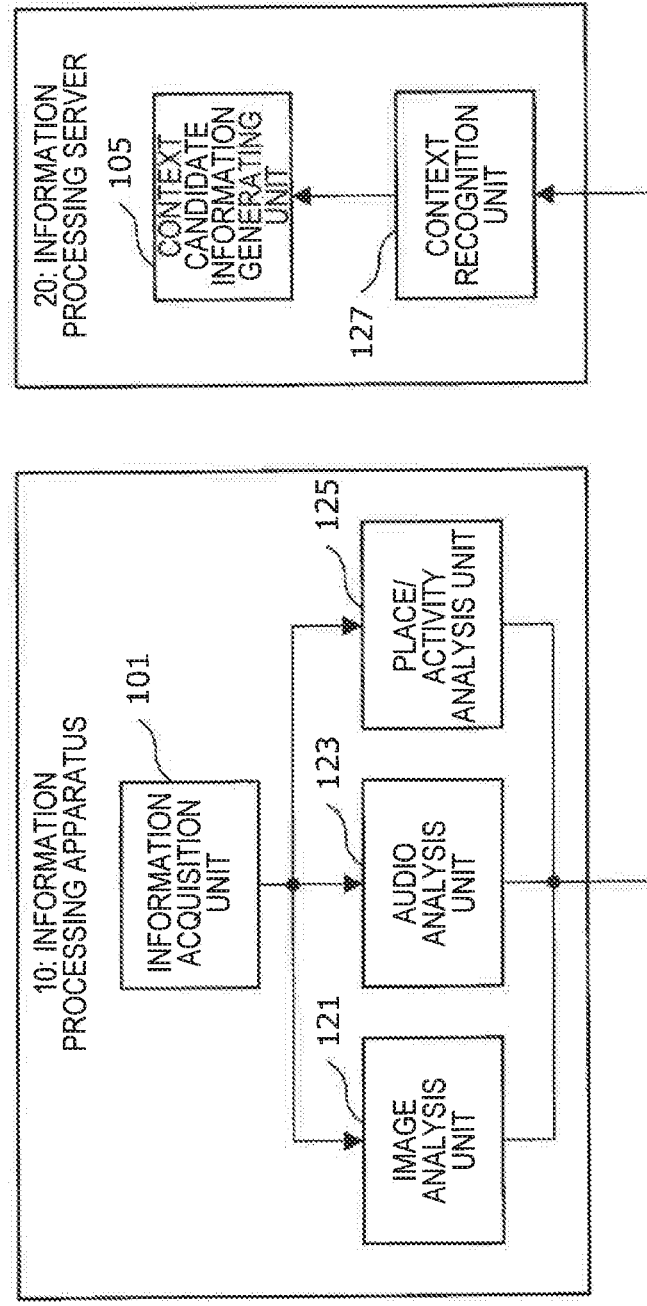
FIG. 20B is an explanatory diagram illustrating an exemplary variation of the information processing apparatus according to the embodiment.

Next, an exemplary variation of the information processing apparatus 10 according to the present embodiment described above will be briefly described, referring to FIGS. 20A and 20B. FIGS. 20A and 20B are explanatory diagrams illustrating an. exemplary variation of the information processing apparatus: according to the present embodiment. Note that FIGS. 20A end 20B illustrate only important parts of respective processing units included in the information processing apparatus 10 illustrated in FIG. 2.

Although the foregoing description is given for case Where the information processing apparatus 10 according to the present embodiment is realized in a single housing, respective processing units of the information processing apparatus 10 according to the present embodiment may be distributed across a plurality of devices. In such a case, the functions of the information processing apparatus 10 are realized as an entire system through mutual cooperation of the plurality of devices including respective processing units.

In the example illustrated in FIG. 20A, for example, only the information acquisition unit 101 is implemented in the information processing apparatus 10, whereas the recognition processing unit 103 and the context candidate information generating unit 105 are implemented in the information processing server 20 connected to the network 1. In the example illustrated in FIG. 20A, various information acquired by the information acquisition unit 101 of the information processing apparatus 10 is transmitted to the information processing server 20 via the network 1, and processing by the recognition processing unit 101 and the context candidate information generating unit 105 is to be performed by the information processing server 20.

Additionally, in the example illustrated in FIG. 20B, the information processing apparatus 10 has implemented therein the information acquisition unit 101, as well as the image analysis unit 121, the audio analysis unit 123 and the place/activity analysis unit 125 which are processing units, of the recognition processing unit 103, for analyzing the user environment. In addition, the information processing server 20 connected to the network 1 has implemented therein the context recognition unit 127 of the recognition processing unit 103 and the context candidate information generating unit 105. In the example illustrated in FIG. 20D, the information acquisition unit 101 of the information processing apparatus 10 acquires various information, and the image analysis unit 121, the audio analysis unit 123, and the place/activity analysis unit 125 analyze the acquired various information to generate information representing the analysis result of the user environment. The information representing the analysis result of the user environment is transmitted to the context recognition unit 127 of the information processing server 20 and, after having been subjected to the context recognition process, context candidate information is generated by the context candidate information generating unit 105.

<Exemplary Display Screen>

Figure 21:
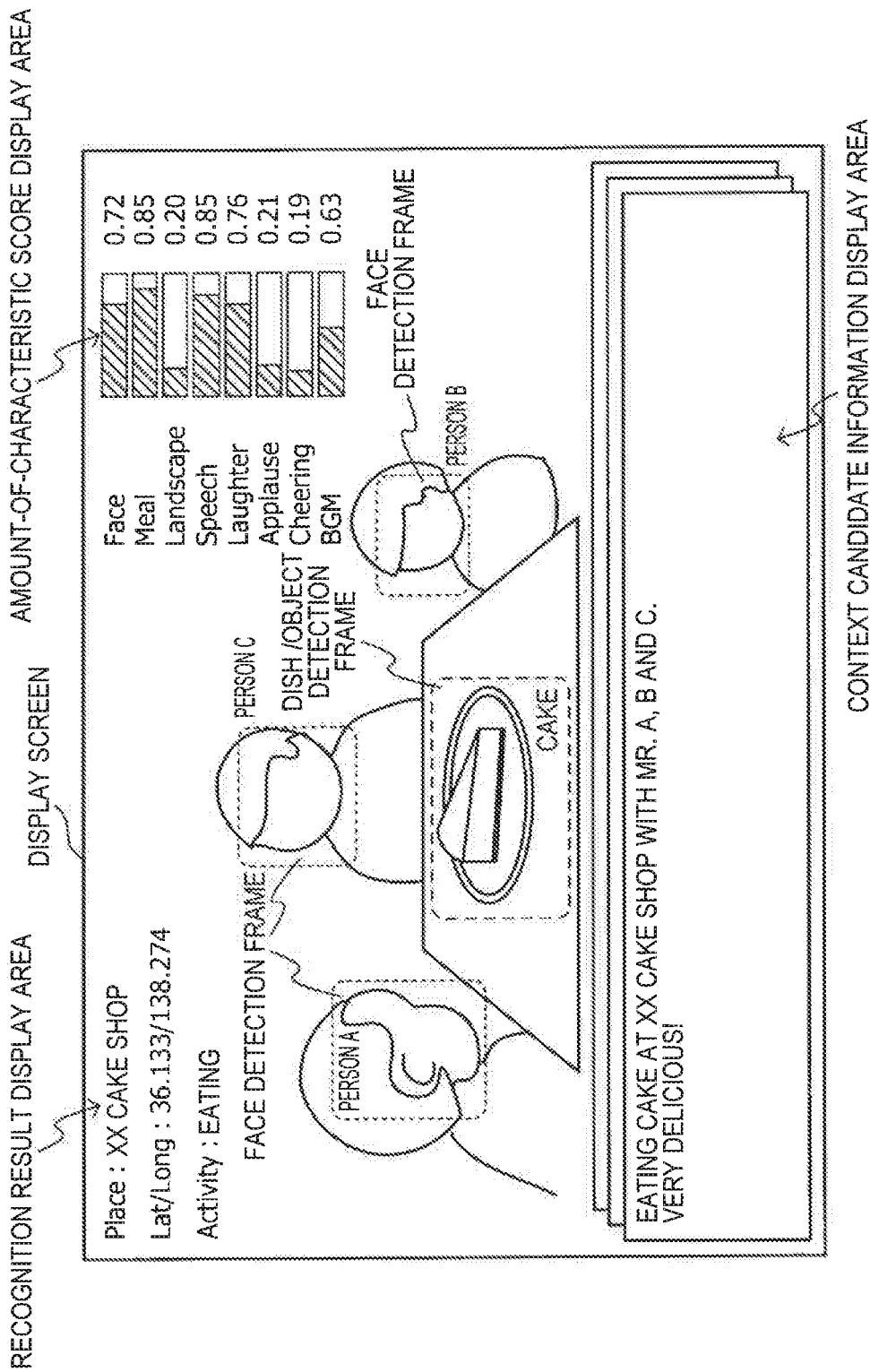
FIG. 21 is an explanatory diagram illustrating an exemplary display screen of the information processing apparatus according to the embodiment.

Next, an exemplary display screen subject to display control by the display control unit 107 of the information processing apparatus 10 according to the present embodiment will be specifically described, referring to FIG. 21. FIG. 21 is an explanatory diagram illustrating an exemplary display screen of the information processing apparatus according lo the present embodiment.

The display screen controlled by the display control unit 107 displays, whenever necessary, an image captured by a camera or the like included in the information processing apparatus 10. In addition, a part of the display screen has provided thereon an area for displaying the amount-of-characteristic score relating to the user environment (amount-of-characteristic score display area), generated as a result of execution by the recognition processing unit 103, and an area for displaying the result of context recognition (recognition result display area), which are controlled by the display control unit 107. When, in addition, a face exists in an image projected on to the display screen, a face detection frame is displayed on the port corresponding to the face, or a dish/object detection frame is displayed when there exists a dish or an object. Furthermore, when context candidate information is generated by the context candidate information generating unit 105 on the basis of the recognition result generated by the recognition processing unit 103, the generated context candidate information is displayed on the context candidate information display area whenever necessary.

The context candidate information is generated each time the context surrounding the user changes, and therefore a plurality of pieces of generated context candidate information is displayed on the context candidate information display area. It is desired that the display control unit 107 divides the context candidate information display area into layers or displays an object corresponding to a scroll bar, as illustrated in FIG. 21, in order to indicate to the user that there exists a plurality of pieces of generated context candidate information.

In addition, the display control unit 107 may prevent the amount-of-characteristic score display area and the recognition result display area from being perceived by the user.

<Exemplary Flow of Context Candidate Information Generating Process>

Figure 22A:
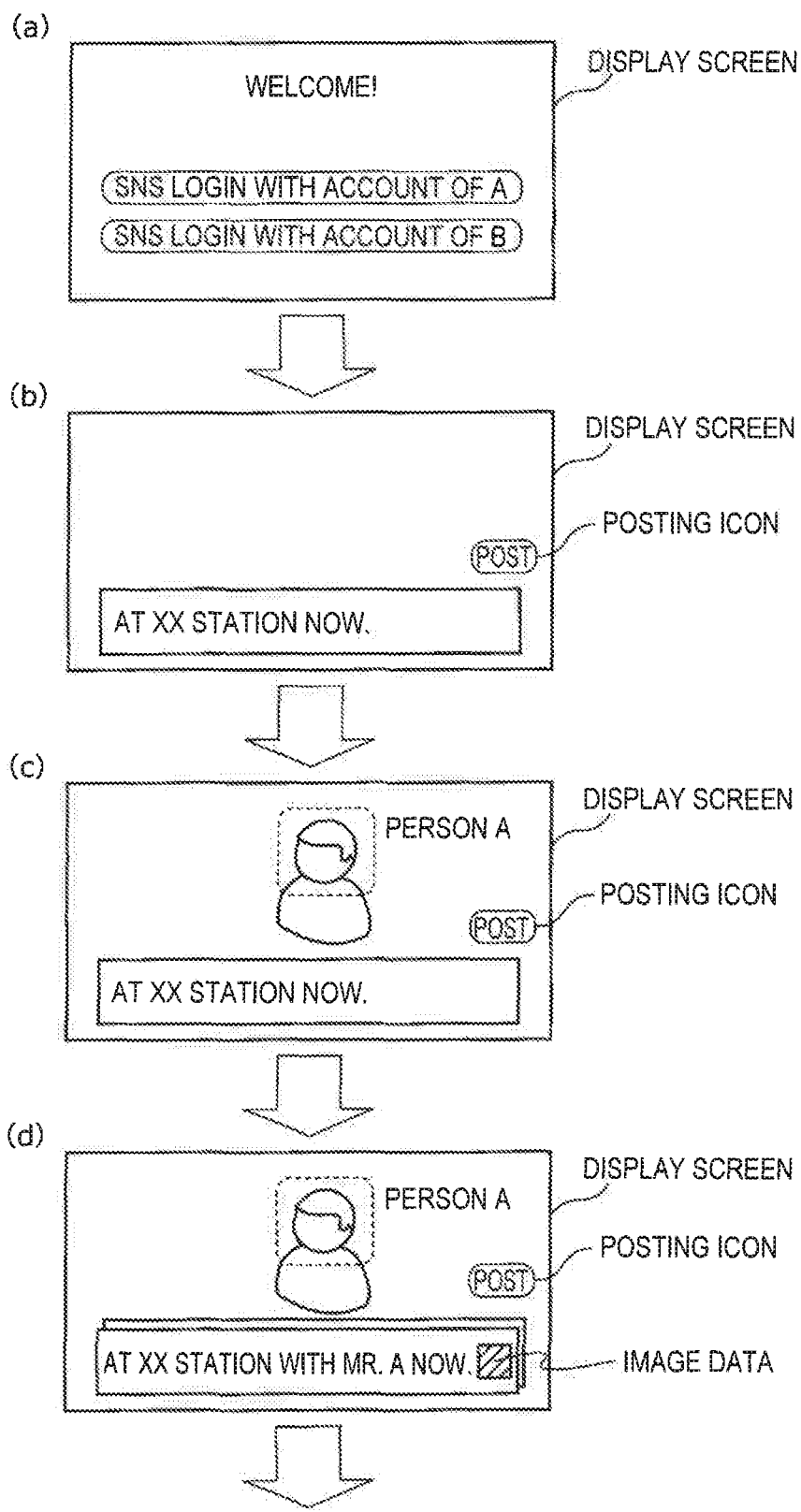
FIG. 22A is an explanatory diagram illustrating an exemplary flow of a context candidate information generating process in the information processing apparatus according to the embodiment.
Figure 22B:
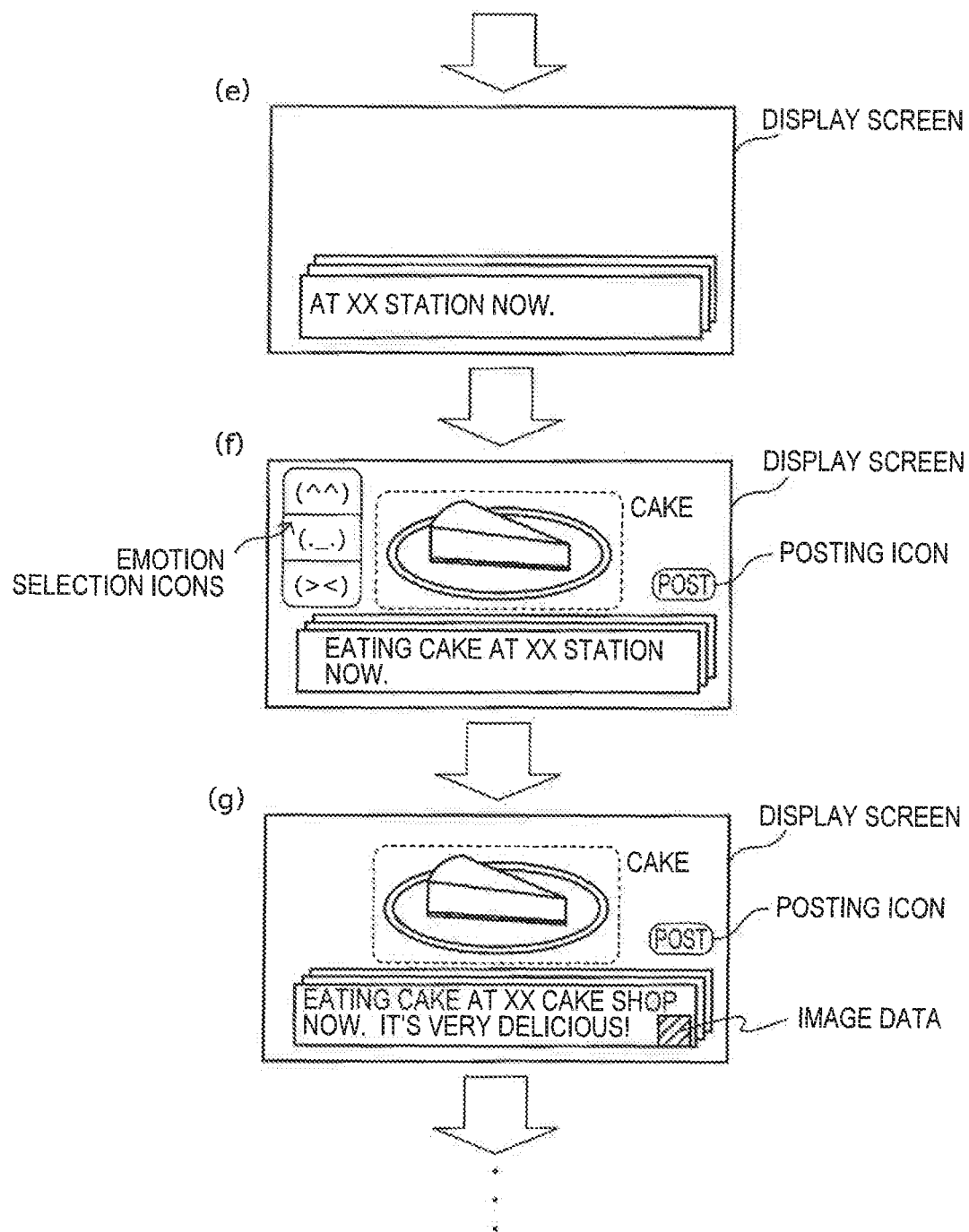
FIG. 22B is an explanatory diagram illustrating an exemplary flow of a context candidate information generating process in the information processing apparatus according to the embodiment.

Next, an exemplary flow of context candidate information generating process performed by the information processing apparatus 10 according to the present embodiment will be briefly described, referring to FIGS. 22A and 22B. FIGS. 22A and 22B are explanatory diagrams illustrating an exemplary flow of the context candidate information generating process in the information processing apparatus according to the present embodiment.

Upon activation of an application providing the aforementioned functions in the information processing apparatus 10 according to the present embodiment, a display screen illustrated in (a) of FIG. 22A is displayed to confirm which social network service the user is intending to post information. Upon selecting by the user an account to be used, a preparation is performed on the basis of the selection result to establish connection with the information posting server 3 providing the corresponding social network service.

Let us assume that the information processing apparatus 10 according to the present embodiment is an accessory-type wearable terminal of an eye-glasses type or a button type, for example, born by the user. As the user moves around, the information processing apparatus 10 keeps acquiring various image data und audio data. Here, it is assumed that, as illustrated in (b) of FIG. 22A, the location information from a location acquisition sensor of the information processing apparatus 10 has revealed that "the place where the user is present is XX Station". In such a case, context candidate in formal ion indicating "at XX Station now" is displayed in the context candidate information display area of the display screen, and also a posting icon is displayed for starting a posting process to the information posting server 3. When the user selects the posting icon, the context candidate information being displayed is transmitted to the information posting server 3 by the context information transmitting unit 109 as the context information.

Let us assume that a camera captures a certain person as illustrated in (c) of FIG. 22A at the next moment. In such a case, the recognition processing unit 103 starts the recognition process on the basis of the acquired image information and, at the time point when the person is identified, a face detection frame and the recognition result are displayed as illustrated in the drawing. Sequentially, upon completion of the context recognition result by the context recognition unit 127, context candidate, information is generated, associating a text "at XX Station with Mr. A now" with the image data taken by the person A, as illustrated in (c1), of FIG. 22A.

When, in addition, the person A disappears from the field of vision of the camera, context candidate information "at XX Station now" is generated in the context candidate information display area, as illustrated in (e) of FIG. 22B.

Let us assume that subsequently the user moves to enter a certain coffee shop, and orders a cake. When the ordered cake is delivered and thus the cake. exists in the field of vision of the camera, context candidate information "Eating a cake at XX Station now" is displayed, and also a posting icon is displayed for starting the posting process to the information posting server 3, as illustrated in (f) of FIG. 22B. Simultaneously, emotion selection icons are displayed on the display screen, with which the user selects his or her current emotion.

When an emotion selection icon is operated by the user, an expression "very delicious)", which is a text expressing the emotion, is added as illustrated in (g) of FIG. 22B. When, in addition, the name of the coffee shop is identified by the recognition processing unit 103, the description previously representing place of "XX Station" is changed to "XX cake shop" with a finer granularity. Furthermore, the image data of the cake is associated with text data "Eating a cake at XX cake shop now. It's very delicious!". The context candidate information is automatically generated, and accumulated in such a flow whenever necessary.

In addition, the display control unit 107 may display a graphical keyboard on the display screen for changing the recognition result (e.g., the name "XX cake shop", or the result of recognizing-the object "cake"), allowing the recognition result to be changed.

<Information Processing Method>

Figure 23:
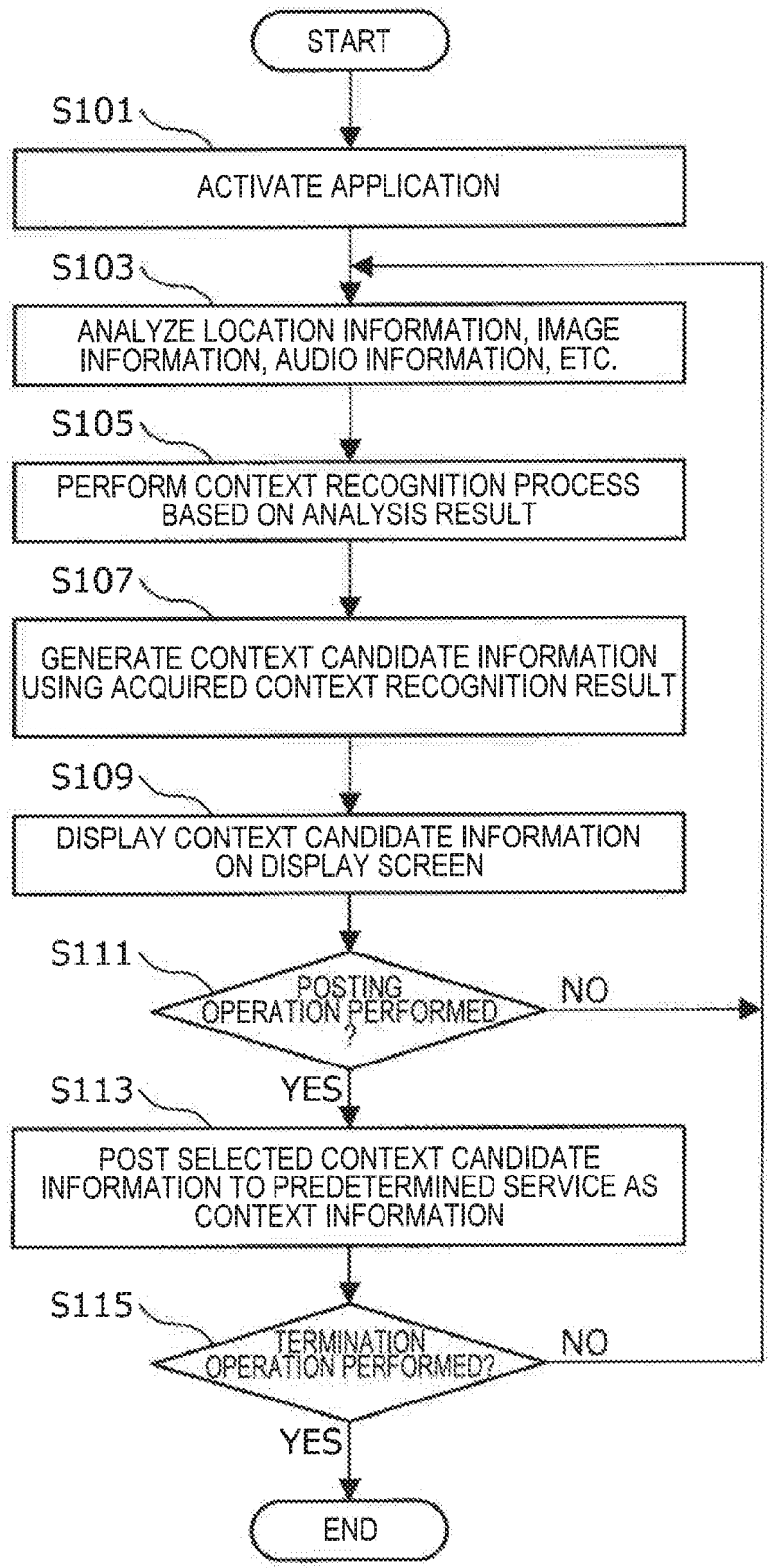
FIG. 23 is a flowchart illustrating an exemplary flow of an information processing method according to the embodiment.

Next, an exemplary flow of an information processing method according to the present embodiment will be briefly described, referring to FIG. 23. FIG. 23 is a flowchart illustrating the exemplary flow of the information processing method according to the present embodiment Upon activation of an application providing the aforementioned functions in the information processing apparatus 10 according to the present embodiment (step S101), user environment information such as location information, image information, audio information, or the like is acquired whenever necessary and output to the recognition processing unit 103 by the information acquisition unit 101.

The recognition processing unit 103 analyzes the location information, image information, audio information, and the like acquired whenever necessary (step S103) and, on the basis of the acquired analysis result of the user environment, performs the context recognition process (step S105). The result of context recognition generated by the context recognition unit 427 is output to the context candidate information generating unit 105.

The context candidate information generating unit 105 generates the context candidate information, using at least the acquired context recognition result (step S107). The generated context candidate lamination is displayed on the display screen by the display control unit 107 whenever necessary (step S109).

Here, the information processing apparatus 10 determines whether or not a posting operation has been performed by the user (step S111). When no posting operation has been performed by the user, the information processing apparatus 10 returns to step S103 and continues the analysis of the user environment information acquired whenever necessary. When, on the other hand, a posting operation has been performed by the user, the context information transmitting unit 109 performs the posting processes by transmitting the user-selected context candidate information to the information posting server 3 as the context information (step S113).

Subsequently, the information processing apparatus 10 determines whether or not a termination operation of the application has been performed by the user (step S115). When no termination operation has been performed by the user, the information processing apparatus 10 returns to step S103 and continues the analysis of the user environment information acquired whenever necessary. When, on the other hand, a termination operation has been performed by the user, the information processing apparatus 10 terminates the process.

A flow of the information processing method performed by the information processing apparatus 10 according to the present embodiment has been briefly described above, referring to FIG. 23.

(Hardware Configuration)

Figure 24:
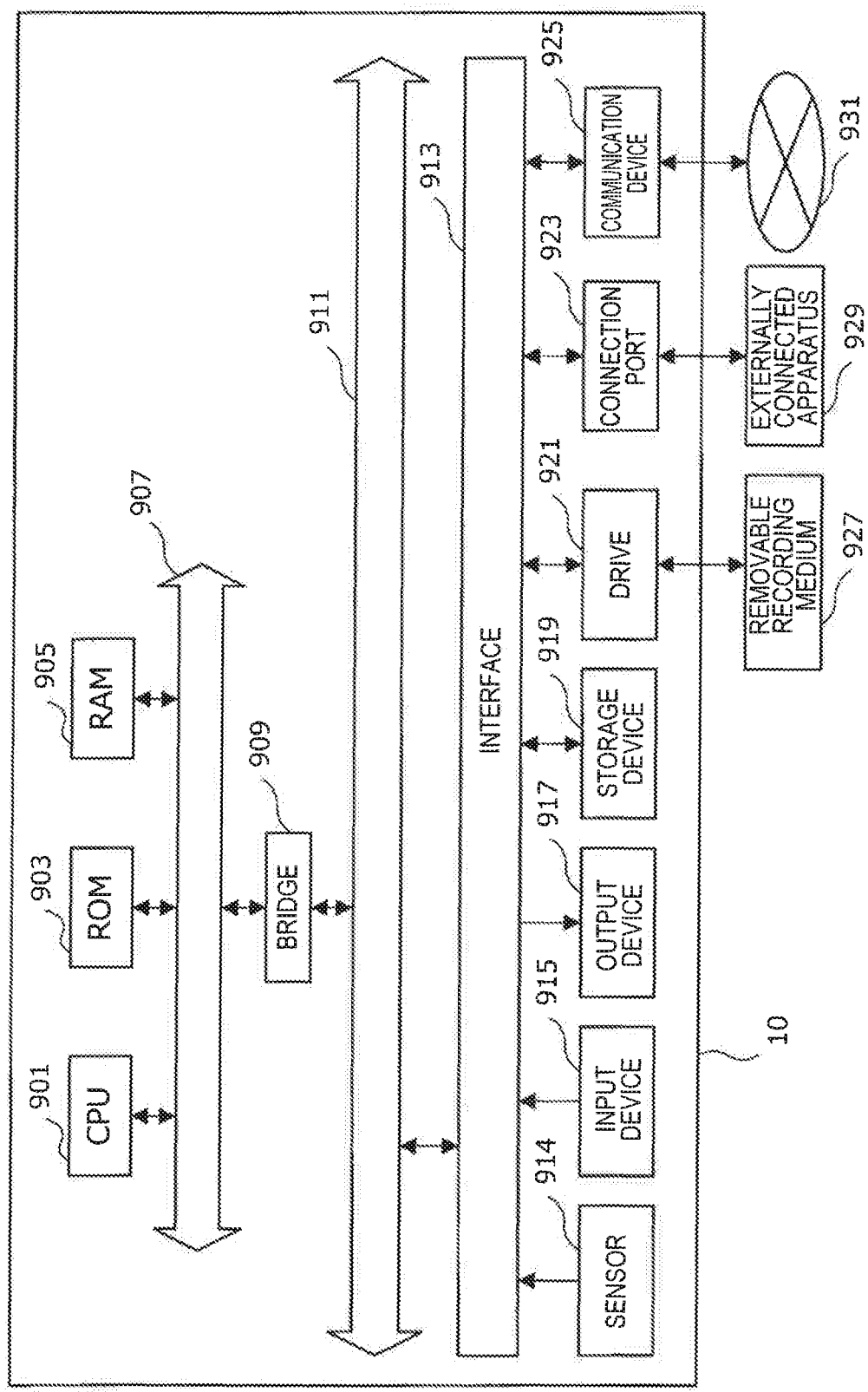
FIG. 24 is a block diagram illustrating an exemplary hardware configuration of the information processing apparatus according to an embodiment of the present disclosure.

Next, the hardware configuration of the information processing apparatus 10. according to the embodiment of the present disclosure will be described in detail with reference to FIG. 24. FIG. 24 is a block diagram for illustrating the hardware configuration of the information processing apparatus 10 according to the embodiment of the present disclosure.

The information processing apparatus 10 mainly includes a CPU 901, a ROM 903, and a RAM 905. Furthermore, the information processing apparatus 10 also includes a host bus 907, a bridge 909, an external bus 911, an interface 913, a sensor 914, an input device 915, an output device 917, a storage device 919, a drive 921, a connection port 923, and a communication device 925.

The CPU 901 serves as an arithmetic processing apparatus und a control device, and controls the overall operation or a part of the operation of the information processing apparatus 10 according to various programs recorded in the ROM 903, the RAM 905, the storage device 919, or a removable recording medium 927. The ROM 903 stores programs, operation parameters, and the like used by the CPU 901. The RAM 905 primarily stores programs that the CPU 901 uses and parameters and the like varying as appropriate during the execution of the programs. These are connected with each other via the host bus 907 configured from an internal bus such as a CPU bus or the like.

The host bus 907 is connected to the external bus 911 such as a PCI (Peripheral Component Interconnect/Interface) bus via the bridge 909.

The sensor 914 is a detecting means such as a sensor configured to detect the user's movement, or a sensor configured to acquire the information representing the current location. As an example of such a sensor, there may be mentioned a motion sensor such as a three-axis acceleration sensor including an acceleration sensor, a gravity detection sensor, a fall detection sensor or the like, or a three-axis gyro sensor including an angular velocity sensor, a shake correction sensor, a geomagnetic sensor or the like, or a GPS sensor. In addition, the sensor 914 may be a detecting means configured lo detect user-specific biological information, or various information used to acquire such biological information. As an example of such a detecting means, there may be mentioned, for example, a sensor for detecting the user's perspiration, a sensor for detecting the user's body temperature and heartbeat, a sensor for detecting the biogenic substances existing on the surface or inside of the user's body. Furthermore, the sensor 914 may include various measurement instruments besides those mentioned above such as a thermometer, a photometer, a hygrometer or the like.

The input device 915 is an operation means operated by a user, such as a mouse, a keyboard, a touch panel, buttons, a switch and a lever. Also, the input device 915 may be a remote control means (a so-called remote control) using, for example, infrared light or other radio waves, or may be an externally connected apparatus 929 such as a mobile phone or a PDA conforming to lite operation of the information processing apparatus 10. Furthermore, the input device 915 generates an input signal based on, for example, information which is input by a user with the above operation means, and is configured from an input control circuit for outputting the input signal to the CPU 901. The user of the information processing apparatus 10 can input various data to the information processing apparatus 10 and can instruct the information processing apparatus 10 to perform processing by operating this input apparatus 915.

The output device 917 is configured from a devices capable of visually or audibly notifying acquired information to a user. Examples of such device include display devices such as a CRT display device, a liquid crystal display device, a plasma display device, an EL display device and lamps, audio output devices such as a speaker and a headphone, a printer, a mobile phone, a facsimile machine, and the like. For example, the output device 917 outputs a result obtained by various processings performed by the information processing apparatus 10. More specifically, the display device displays, in the form of texts or images, a result obtained by various processes performed by the information processing apparatus 10. On the other hand, the audio output device converts an audio signal such as reproduced audio data and sound data into an analog signal, and outputs the analog signal.

The storage device 919 is a device for storing data configured as an example of a storage unit of the information processing apparatus 10 and is used to store data. The storage device 919 is configured from, for example, a magnetic storage device such as a HDD (Hard Disk Drive), a semiconductor storage device, an optical storage device, or a magneto-optical storage device. This storage device 919 stores programs to be executed by the CPU 901, various data, and various data obtained from the outside.

The drive 921 is a reader/writer for recording medium, and is embedded in, the information processing apparatus 10 or attached externally thereto. The drive 921 reads information recorded in the attached removable recording medium 927 such as a magnetic disk, an optical disk, a magneto-optical disk, or a semiconductor memory, and outputs the read information to the RAM 905. Furthermore, the drive 921 can write in the attached removable recording medium 927 such as a magnetic disk, an optical disk, a magneto-optical disk, or a semiconductor memory. The removable recording medium 927 is, for example, a DVD medium, an HD-DVD medium, or a Blu-ray medium. The removable recording medium 927 may be a CompactFlash (CF; registered trademark), a flash memory, an SD memory card (Secure Digital Memory Card), or the like. Alternatively, the removable recording medium 927 may be, for example, an IC card (Integrated Circuit Card) equipped with a non-contact IC chip or an electronic appliance.

The connection port 923 is a port for allowing devices to directly connect to the information processing apparatus 10. Examples of the connection port 923 include a USB (Universal Serial Bus) port, an IEEE1394 port, a SCSI (Small; Computer System Interface) port, and the like. Other examples of the connection port 923 include an RS-232C port, an optical audio terminal, an HDMI (High-Definition Multimedia Interface) port, and the like. By the externally connected apparatus 929 connecting to this connection port 923, the information processing apparatus 10 directly obtains various data from the externally connected apparatus 929 and provides various data to the externally connected apparatus 929.

The communication device 925 is a communication interface configured from, for example, a communication device for connecting to a communication network 931. The communication device 925 is, for example, a wired or wireless LAN (Local-Area Network), Bluetooth (registered trademark), a communication card for WUSB (Wireless USB), or the like. Alternatively, the communication device 925 may be a router for optical communication, a router for ADSL (Asymmetric Digital Subscriber Line), a modem for various communications, or the like. This communication device 925 can transmit and receive signals and the like in accordance with a predetermined protocol such as TCP/IP on the Internet and with other communication, devices, for example. The communication network 931 connected to the communication device 925 is configured from a network and the like, which is connected via wire or wirelessly, and may be, for example, the Internet, a home LAN, infrared communication, radio wave communication, satellite communication, or the like.

Heretofore, an example of the hardware configuration capable of realizing the functions of the information processing apparatus 10 according to the embodiment of the present disclosure has been shown. Each of the structural elements described above may be configured using a general-purpose material, or may be configured from hardware dedicated to the function of each structural element. Accordingly, the hardware configuration to be used can be changed as appropriate according to the technical level at the time of carrying out the present embodiment.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according lo the present disclosure may achieve other effects that are clear to those skilled in the art based on the description of this specification.

Additionally, the present technology may also be configured as below.

(1)

An information processing apparatus including:

a recognition processing unit configured to perform, on the basis of user environment information including at least any of location information representing a location where a user is present, image information relating to an environment surrounding a user, and audio information relating to the environment, an analysis process of at least any of the location information, the image information, und the audio information included in the user environment information, at a predetermined time interval, and to recognize a context surrounding the user, using the acquired result of analysis relating to the user environment; and a context candidate information generating unit configured to generate context candidate information representing a candidate of the context surrounding the user, the context candidate information including, at least, information representing the context surrounding the user and information representing the user's emotion in the context, using the result of context recognition performed by the recognition processing unit.

(2)

The information processing apparatus according to (1), wherein the recognition processing unit outputs information representing the result of context recognition to the context candidate information generating unit each time the context surrounding the user changes.

(3)

The information processing apparatus according to (1) or (2), wherein the information representing the user's emotion is generated using an emotion representation table preliminarily provided for each of the recognized contexts.

(4)

The information processing apparatus according to any one of (1) to (3), wherein the context candidate information generating unit includes, in the context candidate information, at least either the image information or the audio information relating to the context surrounding the user.

(5)

The information processing apparatus according to any one of (1) to (4), further including:

a display control unit configured to display the result of recognition performed by the recognition processing unit and the context candidate information generated by the context candidate information generating unit in a predetermined area of a predetermined display screen.

(6)

The information processing apparatus according to any one of (1) to (5), wherein the recognition processing unit recognizes the context by a time-series pattern recognition process based on time course of the analysis result, or a rule-based process based on predetermined conditional processing, Using the result of analysis relating to the user environment.

(7)

The information processing apparatus according to any one of (1) to (6), further including:

an information updating unit configured to update expression representing the user's emotion included in an emotion representation table preliminarily provided for each of the recognized contexts, using at least any of the result of analysis relating to the user environment performed by the recognition processing unit, a remark or a sentence expression provided by the user, and an output from a sensor provided in the information processing apparatus.

(8)

The information processing apparatus, according to any one of (1) to (7), further including:

an external device cooperation unit configured to cooperate with another information, processing apparatus with which mutual communication is possible, and to improve precision of, or share, the result of generation of the context candidate information performed by the context candidate information generating unit.

(9)

The information processing apparatus according to any one of (1) to (8), further including:

a context information transmitting unit configured to transmit a piece of information selected by the user from the context candidate information generated by the context candidate information generating unit to an information posting server providing a social network service its context information representing the context surrounding the user.

(10)

The information processing apparatus according to any one of (1) to (9), wherein the information processing apparatus is a personal digital assistant carried by a user, or a wearable terminal worn by a user.

(11)

An information processing method including:

performing, on the basis of user environment information including at least any of location information representing a location where a user is present, image information relating to an environment surrounding a user, and audio information relating, to the environment, an analysis process of at least any of the location information, the image information, and the audio information included in the user environment information, at a predetermined tiny interval, and recognizing a context surrounding the user, using the acquired result of analysis relating to the user environment; and generating context candidate information representing a candidate of the context surrounding the user, the context candidate information including, at least, information representing the context surrounding the user and information representing the user's emotion in the context, using the result of context recognition.

(12)

A program for causing a computer to realize:

a recognition processing function of performing, on the basis of user environment information including at least any of location information representing a location where a user is present, image information relating to an environment surrounding a user, and audio information relating to the environment, an analysis process of at least any of the location information, the image information, and the audio information included in the user environment information, at a predetermined time interval, and recognizing a context surrounding the user, using the acquired result of analysis relating to the user environment; and a context candidate information generating function of generating context candidate information representing a candidate of the context surrounding the user, the context candidate information including, at least, information representing the context surrounding the user and information representing the user's emotion in the context, using the result of context recognition performed by the recognition processing unit.

REFERENCE SIGNS LIST 1 network
3 information posting server
5 service providing server
10 information processing apparatus
20 information processing server
101 information acquisition unit
103 recognition processing unit
105 context candidate information generating unit
107 display control unit
109 context information transmitting unit
111 information updating unit
113 external device cooperation unit
115 storage unit

The invention claimed is:

1. An information processing apparatus comprising:
a processor configured to:
retrieve environment information including location information and image information, the retrieved environment information including environment information obtained by a sensor of an external device as an input,
perform an image analysis process on an image included in the image information of the environment information as part of a recognition process to recognize an object included in the image based on characteristics of the object,
output a classification of the object recognized by the recognition process as a type of object and a score based on an amount of the characteristics corresponding to the type of object of the classification, and
generate context candidate information representing a context of the image based on the location information, the classification, and the score,
wherein the processor applies a machine learning model constructed from a plurality of images collected in advance to assist in recognition of the object in the recognition process.

2. The information processing apparatus according to claim 1,
wherein the sensor of the external device is a camera.

3. The information processing apparatus according to claim 1,
wherein the object is at least one of a face, a landscape and a dish.

4. The information processing apparatus according to claim 1,
wherein, when the object is recognized to be a face, the processor further controls a display identifying a region of a face.

5. The information processing apparatus according to claim 1,
wherein the processor is further configured to initiate display of the score and the classification as the recognition result in a predetermined area of a predetermined display screen.

6. The information processing apparatus according to claim 1,
wherein, when the object is recognized to be a face, the processor is configured to further control a display to identify a person who corresponds to the face.

7. The information processing apparatus according to claim 1,
wherein the processor further outputs at least one of number of faces, coordinates, angles, face detection score, presence or absence of smile, age, and race.

8. The information processing apparatus according to claim 1,
wherein the processor is further configured to transmit a piece of information selected by the user from the generated context candidate information to an information posting server providing a social network service.

9. The information processing apparatus according to claim 8,
wherein the piece of information includes the image.

10. The information processing apparatus according to claim 8,
wherein the processor further controls a display of emotion selection icons together with the selected generated context candidate information.

11. The information processing apparatus according to claim 1,
wherein the information processing apparatus comprises a personal digital assistant carried by a user, or a wearable terminal worn by a user.

12. The information processing apparatus according to claim 1,
wherein the external device is a personal digital assistant carried by a user, or a wearable terminal worn by a user.

13. An information processing method, executed via at least one processor, the method comprising:
retrieving environment information including location information and image information, the retreived environment information including environment information obtained by a sensor of an external device as an input;
performing an image analysis process on an image included in the image information of the environment information as part of a recognition process to recognize an object included in the image based on characteristics of the object;
outputting a classification of the object recognized by the recognition process as a type of object and a score based on an amount of the characteristics corresponding to the type of object of the classification; and
generating context candidate information representing a context of the image based on the location information, the classification, and the score,
wherein the performing includes applying a machine learning model constructed from a plurality of images collected in advance to assist in recognition of the object in the recognition process.

14. The method according to claim 13, wherein the classification includes at least one of a face, a landscape, a dish, or an object.

15. The method according to claim 13, wherein, the classification includes at least one face, and the outputting further includes outputting at least one of a number of faces, coordinates, angles, presence or absence of smile, age, or race.

16. The method according to claim 13, wherein, in response to the object being recognized as a face, the outputting further includes controlling a display that identifies a region of a face.

17. The method according to claim 13, wherein the outputting further includes initiating displaying of the score and the classification as the recognition result in a predetermined area of a predetermined display screen.

18. The method according to claim 13, wherein, when the object is recognized to be a face, the outputting includes displaying an identification of a person who corresponds to the face.

19. The method according to claim 13, further comprising transmitting a piece of information selected by the user from the generated context candidate information to an information posting server providing a social network service.

20. A non-transitory computer-readable medium having embodied thereon a program, which when executed by a computer causes the compute to execute a method, the method comprising:
retrieving environment information including location information and image information, the retreived environment information including environment information obtained by a sensor of an external device as an input;
performing an image analysis process on an image included in the image information of the environment information as part of a recognition process to recognize an object included in the image based on characteristics of the object;
outputting a classification of the object recognized by the recognition process as a type of object and a score based on an amount of the characteristics corresponding to the type of object of the classification; and
generating context candidate information representing a context of the image based on the location information, the classification, and the score,
wherein the performing includes applying a machine learning model constructed from a plurality of images collected in advance to assist in recognition of the object in the recognition process.

* * * * *